US012679736B2

(12) United States Patent
Yelvington et al.

(10) Patent No.: US 12,679,736 B2
(45) Date of Patent: \*Jul. 14, 2026

(54) METHODS, SYSTEMS AND APPARATUS FOR CARBON CAPTURE, UTILIZATION AND STORAGE

(71) Applicant: M2X Energy Inc., Rockledge, FL (US)

(72) Inventors: Paul E. Yelvington, Rockledge, FL (US); John Anthony Dean, Scotia, NY (US); Joshua B. Browne, New York, NY (US)

(73) Assignee: M2X Energy Inc., Rockledge, FL (US)

( \* ) Notice: Subject to any disclaimer, the term of this patent is extended or adjusted under 35 U.S.C. 154(b) by 393 days.

This patent is subject to a terminal disclaimer.

(21) Appl. No.: 18/161,060

(22) Filed: Jan. 28, 2023

(65) Prior Publication Data

US 2023/0286807 A1 Sep. 14, 2023

Related U.S. Application Data

(63) Continuation-in-part of application No. 17/953,056, filed on Sep. 26, 2022, and a continuation-in-part of
(Continued)

(51) Int. Cl.
*C01B 32/50* (2017.01)

(52) U.S. Cl.
CPC ...... *C01B 32/50* (2017.08); *C01B 2203/0238* (2013.01); *C01B 2203/0866* (2013.01); *C01B 2203/86* (2013.01)

(58) Field of Classification Search
CPC . Y02C 20/40; C01B 32/50; C01B 2203/0238; C01B 2203/0866; C01B 2203/86
See application file for complete search history.

(56) References Cited

U.S. PATENT DOCUMENTS

| 1,107,582 A | 8/1914 | Brownlee |
| 2,362,151 A | 11/1944 | Ostenberg |
| (Continued) | | |

FOREIGN PATENT DOCUMENTS

| CN | 103216316 | 4/2015 |
| EP | 2028350 | 2/2009 |
| (Continued) | | |

OTHER PUBLICATIONS

Nov. 30, 2022, PCT , PCT/US2022/029707 Search and Opinion.
(Continued)

*Primary Examiner* — Vishal V Vasisth
(74) *Attorney, Agent, or Firm* — Glen P. Belvis; Belvis Law, LLC.

(57) ABSTRACT

There are provided CCUS systems and methods having gas-to-liquid systems and processes, e.g., for processing flare gas to methanol. In these systems an air-breathing engine reformer produces a syngas intermediate that is further converted to methanol in a downstream synthesis step. The CCUS system has a $CO_2$ separator that receives a gas-phase stream and separates this stream into two streams, a $CO_2$-rich stream and a $CO_2$-depleted stream. The CCUS systems may further have a hydrogen separator that receive a gas-phase stream and separates that stream into a hydrogen-rich stream and a hydrogen-depleted stream. The $CO_2$-rich stream can be used for use in EOR, storage or both.

27 Claims, 11 Drawing Sheets

Related U.S. Application Data application No. 17/984,126, filed on Nov. 9, 2022, and a continuation-in-part of application No. 17/746, 942, filed on May 17, 2022, now Pat. No. 11,649,201.

(60) Provisional application No. 63/277,522, filed on Nov. 9, 2021, provisional application No. 63/304,463, filed on Jan. 28, 2022, provisional application No. 63/304,471, filed on Jan. 28, 2022, provisional application No. 63/304,475, filed on Jan. 28, 2022, provisional application No. 63/189,756, filed on May 18, 2021, provisional application No. 63/213,129, filed on Jun. 21, 2021, provisional application No. 63/197,898, filed on Jun. 7, 2021, provisional application No. 63/248,519, filed on Sep. 26, 2021.

(56) References Cited

U.S. PATENT DOCUMENTS

| | | | |
|---|---|---|---|
| 2,543,791 | A | 3/1951 | Malin |
| 2,591,687 | A | 4/1952 | Eastman |
| 2,846,297 | A | 8/1958 | Herwig |
| 4,965,052 | A | 10/1990 | Lowther |
| 6,174,460 | B1 | 1/2001 | Grunvald |
| 7,040,270 | B2 | 5/2006 | Herdin |
| 7,367,183 | B2 | 5/2008 | Eberspach |
| 8,366,796 | B2 | 2/2013 | Mitchell |
| 8,413,617 | B2 | 4/2013 | Simpson |
| 8,574,501 | B1 | 11/2013 | Greer |
| 8,677,949 | B2 | 3/2014 | Bromberg |
| 8,793,981 | B2 | 8/2014 | Li |
| 8,795,597 | B2 | 8/2014 | Conrad |
| 8,857,405 | B2 | 10/2014 | Attard |
| 8,858,900 | B2 | 10/2014 | Galloway |
| 8,882,863 | B2 | 11/2014 | Modroukas |
| 8,901,179 | B2 | 12/2014 | Raffaele |
| 9,051,237 | B2 | 6/2015 | Peter |
| 9,151,212 | B2 | 10/2015 | Dumser |
| 9,169,773 | B2 | 10/2015 | Bromberg |
| 9,316,144 | B2 | 4/2016 | Gruber |
| 9,353,674 | B2 | 5/2016 | Bunce |
| 9,637,433 | B2 | 5/2017 | Zubrin |
| 9,643,906 | B2 | 5/2017 | Zubrin |
| 9,725,386 | B2 | 8/2017 | Zubrin |
| 9,771,919 | B2 | 9/2017 | Kim |
| 9,856,197 | B2 | 1/2018 | Zubrin |
| 9,909,491 | B2 | 3/2018 | Bromberg |
| 9,957,888 | B2 | 5/2018 | Lissianski |
| 10,125,726 | B2 | 11/2018 | Henry |
| 10,144,877 | B2 | 12/2018 | Ravikumar |
| 10,161,296 | B2 | 12/2018 | Schock |
| 10,184,374 | B2 | 1/2019 | Han |
| 10,233,808 | B2 | 3/2019 | Backhaus |
| 10,233,871 | B2 | 3/2019 | Hill |
| 10,260,460 | B2 | 4/2019 | Singh |
| 10,465,631 | B2 | 11/2019 | Lissianski |
| 10,513,435 | B2 | 12/2019 | Edalati |
| 10,654,023 | B2 | 5/2020 | Jahnke |
| 10,669,220 | B2 | 6/2020 | Balthasar |
| 10,787,959 | B2 | 9/2020 | Roychoudhury |
| 10,815,123 | B2 | 10/2020 | Northrop |
| 10,815,912 | B2 | 10/2020 | Bhosekar |
| 10,865,709 | B2 | 12/2020 | Hwang |
| 10,890,120 | B2 | 1/2021 | Hehle |
| 10,907,559 | B2 | 2/2021 | Asai |
| 10,947,934 | B2 | 3/2021 | Asai |
| 11,131,277 | B2 | 9/2021 | Asai |
| 11,168,045 | B2 | 11/2021 | Moreo |
| 11,192,843 | B2 | 12/2021 | Badgandi |
| 11,292,717 | B2 | 4/2022 | Vicari |
| 11,649,201 | B2 | 5/2023 | Yelvington |
| 11,649,777 | B2 | 5/2023 | Capenter |
| 11,845,712 | B2 | 12/2023 | Ridley |
| 11,851,393 | B2 | 12/2023 | Early |
| 12,264,122 | B2 | 4/2025 | Ridley |
| 12,304,816 | B2 | 5/2025 | Barnett |
| 2002/0131907 | A1 | 9/2002 | Iwasaki |
| 2005/0217178 | A1 | 10/2005 | Aoyama |
| 2010/0126135 | A1 | 5/2010 | Digamber |
| 2010/0175379 | A1 | 7/2010 | Liu |
| 2010/0275891 | A1 | 11/2010 | Gruber |
| 2012/0103302 | A1 | 5/2012 | Attard |
| 2013/0160734 | A1 | 6/2013 | Redtenbacher |
| 2014/0041412 | A1* | 2/2014 | Keller ..................... C01B 3/52 |
| | | | 62/617 |
| 2014/0373531 | A1 | 12/2014 | Wong |
| 2015/0126628 | A1 | 5/2015 | Patience |
| 2015/0300296 | A1 | 10/2015 | Mulye |
| 2016/0053668 | A1 | 2/2016 | Loetz |
| 2016/0152537 | A1 | 6/2016 | Zubrin |
| 2018/0086683 | A1 | 3/2018 | Sapienza |
| 2019/0337876 | A1 | 11/2019 | Short |
| 2020/0222874 | A1 | 7/2020 | Manenti |
| 2021/0130272 | A1 | 5/2021 | Lepri |
| 2022/0388842 | A1 | 12/2022 | Browne |
| 2022/0401906 | A1 | 12/2022 | Dean |
| 2022/0403272 | A1 | 12/2022 | Dean |
| 2023/0064109 | A1 | 3/2023 | Lourenco |
| 2023/0116003 | A1 | 4/2023 | Feinstein |
| 2023/0212098 | A1 | 7/2023 | Yelvington |
| 2023/0257330 | A1 | 8/2023 | Breidenstein |
| 2023/0279802 | A1 | 9/2023 | Merical |
| 2023/0286807 | A1 | 9/2023 | Yelvington |
| 2023/0340919 | A1 | 10/2023 | Mercal |
| 2024/0017235 | A1 | 1/2024 | Yelvington |
| 2024/0017993 | A1 | 1/2024 | Dean |
| 2024/0051824 | A1 | 2/2024 | Paravathikar |
| 2024/0124377 | A1 | 4/2024 | Yelvington |
| 2025/0042829 | A1 | 2/2025 | Muscionico |

FOREIGN PATENT DOCUMENTS

| | | |
|---|---|---|
| EP | 2606211 | 3/2013 |
| EP | 2998538 | 3/2016 |
| EP | 3037646 | 5/2016 |
| WO | WO 2015/138987 | 9/2015 |
| WO | WO 2024040124 | 2/2024 |
| WO | WO 2025022348 | 1/2025 |
| WO | WO 2025141340 | 7/2025 |

OTHER PUBLICATIONS

Nov. 4, 2022, PCT, PCT/US2022/029708 Search and Opinion.
Apr. 2016, Lim, et al, The Engine Reformer: Syngas Production in an Engine for Compact Gas-to-Liquids Synthesis; vol. 94, p. 623 (Canadian Journal of Chem Eng).
Feb. 2019, Medhat, et al, Frontiers in combustion techniques and burner designs for emissions control and CO2 capture: A review; Int J Energy Res 2019;1.
Apr. 2015 , Pederstad, et al, Improving utilization of assoicated gas in US tight oil fields (Carbon Limits AS).
(Down loaded) 2022, Nissan, VC-Turbo Engine (https://www.nissan-global.com/EN/INNOVATION/TECHNOLOGY/ARCHIVE/VC_TURBO_ENGINE/).
Apr. 2016, Emmanuel, The Engine Reformer: Syngas Production in an Engine for Compact Gas-to-Liquids Synthesis.
Jun. 23, 2023, Third Party, Third Party submission in U.S. Appl. No. 17/746,927 (claims charts).
Jun. 23, 2023, Third Party, Third Party submission in U.S. Appl. No. 17/746,927 (List of References).
Jun. 2015, Lim, The Engine Reformer: Syngas Production in Engines Using Spark-Ignition and Metallic Foam Catalysts (pp. title-50).
2023, Third Party submission in U.S. Appl. No. 17/746,927 (pp. 51-75).
2023, Third Party submission in U.S. Appl. No. 17/746,927 (pp. 76-100).
2023, Third Party submission in U.S. Appl. No. 17/746,927 (pp. 101-130).
2023, Third Party submission in U.S. Appl. No. 17/746,927 (pp. 131-162).

(56)         References Cited

OTHER PUBLICATIONS

Oct. 1, 1986, Thermodynamic Properties of Key Organic Oxygen Compounds in the Carbon Range C, to C, Part 2. Ideal Gas Properties.

1998, Chase, Journal of Physical and Chemical Reference Data Monograph No. 9 NIST-JANAF Thermochemical Tables Fourth Edition Part,I Al—Co.

Jan. 2021, Methanol Institute, Innovation Outlook Renewable Methanol.

Mar. 2020, IEA, Reducing the environmental impact of oil and gas supply is a pivotal element of global energy transitions.

Jan. 20, 2016, Lim, The Engine Reformer: Synagas Production in an Engine for Compact Gas-to-Liquids Synthesis.

1956, Ing , Production of synthesis gas in the gasoline engine with simultaneous gain in work (Google Translation).

Jun. 25, 1963, Yamamoto, Production of Synthesis Gas by an Internal Combustion Engine.

1983, Picken, A Method for Estimating Overhaul Life of Internal Operating on Biogas and Methane.

2023, Karim, The Production of Hydrogen by the Partial Oxidtion of Methane in a Dual Fuel Engine.

2001, Ogden, Examination of Rich Mixture Operation of a Dual Fuel Engine.

Oct. 6, 2005, McMillian, Experimental and modeling study of hydrogen/syngas production and particulate emissions from a natural gas-fueled partial oxidation engine.

2008, Karim, The production of hydrogen through the uncatalyzed partial oxidation of methane in an internal combustion engine.

2014, Morsy, Modeling study on the production of hydrogen/syngas via partial oxidation using a homogeneous charge compression ignition engine fueled with natural gas.

2016, Lim, The Engine Reformer: Syngas Production in an Engine for Compact Gas-to-Liquids Synthesis.

Mar. 16, 2018, Tartakovsky, Fuel reforming in internal combustion engines.

Jan. 25, 2019, Banke, Power and syngas production from partial oxidation of fuel-rich methane/DME mixtures in an HCCI engine.

Apr. 2, 2019, Voice, Fuel and Engine Effects on Rich-Combustion Products as an Enabler of In-Cylinder Reforming.

Apr. 14, 2020, Wang, Extend Syngas Yield through Increasing Rich Limit by Stratified Air Injection in a Single Cylinder Engine.

2020, Paykani, Synthesis gas as a fuel for internal combustion engines in transportation.

Jul. 14, 2005, Yelvington, On piston engines as hydrocarbon gas reformers for modular, distributed chemical production.

2013, Browne, Economic analysis of a non-catalytic, partial-oxidation methane reformer using an internal combustion engine.

2018, Idicheria, An Advanced Ignition System for High Efficiency Engines.

2023, Karim (believed to be), Photo copy of book pp. 54-72.

2017, L'Heureux, Repurposing mass-produced internal combustion engines Quantifying the value and use of low-cost internal combustion piston engines for modular applications in energy and chemical engineering industries.

2025, Shin, CFD modeling of non-catalytic, partial-oxidation engine reformer for flare mitigation.

South West Research Institute (SwRI), Diesel Cylinder Head Design up to 250 Bar Peak Cylinder Pressure.

* cited by examiner

Global Warming Potential (GWP) Values Relative to $CO_2$

| Industrial Designation or Common Name | Chemical Formula | GWP Values for 100-Year Time Horzon | | |
|---|---|---|---|---|
| | | Second Assessment Report (SAR) | Fourth Assessment Report (AR4) | Fifth Assessment Report (AR5) |
| Carbon Dioxide | $CO_2$ | 1 | 1 | 1 |
| Methane | $CH_4$ | 21 | 25 | 28 |
| Nitrous Oxide | $N_2O$ | 310 | 298 | 265 |

FIG. 11

METHODS, SYSTEMS AND APPARATUS FOR CARBON CAPTURE, UTILIZATION AND STORAGE

This application: (i) claims under 35 U.S.C. § 119 (e)(1) the benefit of the filing date of, and claims the benefit of priority to, U.S. provisional application Ser. No. 63/304,457, filed Jan. 28, 2022; (ii) is a continuation in part of U.S. application Ser. No. 17/746,942, filed May 17, 2022, now U.S. Pat. No. 11,649,201 which claims under 35 U.S.C. § 119 (e)(1) the benefit of the filing date of, and claims the benefit of priority to, U.S. provisional application Ser. No. 63/189,756 filed May 18, 2021, 63/213,129 filed Jun. 21, 2021, and 63/197,898 filed Jun. 7, 2021; (iii) is a continuation in part of U.S. application Ser. No. 17/953,056, filed Sep. 26, 2022, which claims under 35 U.S.C. § 119 (e)(1) the benefit of the filing date of, and claims the benefit of priority to, U.S. provisional application Ser. No. 63/248,519, filed Sep. 26, 2021; (iv) is a continuation in part of U.S. application Ser. No. 17/984,126, filed Nov. 9, 2022, which claims under 35 U.S.C. § 119 (e)(1) the benefit of the filing date of, and claims the benefit of priority to, U.S. provisional application Ser. No. 63/277,522 filed Nov. 9, 2021; (v) claims under 35 U.S.C. § 119 (e)(1) the benefit of the filing date of, and claims the benefit of priority to, US provisional application Ser. No. 63/304,471, filed Jan. 28, 2022; and, (vi) claims under 35 U.S.C. § 119 (e)(1) the benefit of the filing date of, and claims the benefit of priority to, U.S. provisional application Ser. No. 63/304,463, filed Jan. 28, 2022, the entire disclosure of each of which is incorporated herein by reference.

BACKGROUND OF THE INVENTION

Field of the Invention

The present inventions relate to new and improved methods, devices and systems for recovering and converting waste gases, such as flare gas, into useful and economically viable materials and to separate, capture and utilize $CO_2$, $H_2$ or both from process, waste or exhaust gas streams.

The term "flare gas", "waste gas" and similar such terms should be given their broadest possible meaning, and would include gas generated, created, associated or produced by or from oil and gas production, hydrocarbon wells (including conventional and unconventional wells), petrochemical processing, refining, landfills, wastewater treatment, dairies, livestock production, and other municipal, chemical and industrial processes. Thus, for example, flare gas and waste gas would include stranded gas, associated gas, landfill gas, vented gas, biogas, digester gas, small-pocket gas, and remote gas.

Typically, the composition of flare gas is a mixture of different gases. The composition can depend upon the source of the flare gas. For instance, gases released during oil and gas production mainly contain natural gas. Natural gas is more than 90% methane ($CH_4$) with ethane and smaller amounts of other hydrocarbons, water, $N_2$ and $CO_2$ may also be present. Flare gas from refineries and other chemical or manufacturing operations typically can be a mixture of hydrocarbons and in some cases $H_2$. Landfill gas, biogas or digester gas typically can be a mixture of $CH_4$ and $CO_2$, as well as small amounts of other inert gases. In general, flare gas can contain one or more of the following gases: methane, ethane, propane, n-butane, isobutane, n-pentane, isopentane, n-hexane, ethylene, propylene, 1-butene, carbon monoxide, carbon dioxide, hydrogen sulfide, hydrogen, oxygen, nitrogen, and water.

The majority of flare gas is produced from smaller, individual point sources, such as a number of oil or gas wells in an oil field, a landfill, or a chemical plant. Prior to the present inventions flare gas, and in particular flare gas generated from hydrocarbon producing wells, and other smaller point sources, was burned to destroy it, and in some instances may have been vented directly into the atmosphere. This flare gas could not be economically recovered and used. The burning or venting of flare gas, both from hydrocarbon production and other endeavors, raises serious concerns about pollution and the production greenhouse gases.

As used herein unless specified otherwise, the terms "syngas" and "synthesis gas" and similar such terms should be given their broadest possible meaning and would include gases having as their primary components a mixture of $H_2$ and CO; and may also contain $CO_2$, $N_2$, and water, as well as, small amounts of other materials.

As used herein unless specified otherwise, the term "product gas" and similar such terms should be given their broadest possible meaning and would include gases having $H_2$, CO and other hydrocarbons, and typically significant amounts of other hydrocarbons, such as methane.

As used herein unless specified otherwise, the term "reprocessed gas" includes "syngas", "synthesis gas" and "product gas".

As used herein unless specified otherwise, the terms "partial oxidation", "partially oxidizing" and similar such terms mean a chemical reaction where a sub-stoichiometric mixture of fuel and air (i.e., fuel-rich mixture) is partially reacted (e.g., combusted) to produce a syngas. The term partial oxidation includes both thermal partial oxidation (TPDX), which typically occurs in a non-catalytic reformer, and catalytic partial oxidation (CPDX). The general formula for a partial oxidation reaction is $$C_nH_m + \frac{n}{2}O_2 \longrightarrow nCO + \frac{m}{2}H_2$$

As used herein unless specified otherwise, the recitation of ranges of values herein is merely intended to serve as a shorthand method of referring individually to each separate value falling within the range. Unless otherwise indicated herein, each individual value within a range is incorporated into the specification as if it were individually recited herein.

Generally, the term "about" as used herein unless stated otherwise is meant to encompass the larger of a variance or range of ±10%, or the experimental or instrument error associated with obtaining the stated value.

As used herein unless specified otherwise, the term "$CO_2e$" is used to define carbon dioxide equivalence of other, more potent greenhouse gases, to carbon dioxide (e.g., methane and nitrous oxide) on a global warming potential basis of 20 or 100 years, based on Intergovernmental Panel on Climate Change (IPCC) Fifth Assessment Report (AR5) methodology. The term "carbon intensity" is taken to mean the lifecycle $CO_2e$ generated per unit mass of a product.

As used herein, unless specified otherwise, the term "crude methanol" is defined as methanol produced in a methanol synthesis loop prior to the removal of water, dissolved gases, or other contaminants. Crude methanol often contains 5-20 wt % water, dissolved gases (e.g., 1-2 wt % $CO_2$) and trace contaminants (e.g., ethanol). As used herein, unless specified otherwise, the term "stabilized methanol" is defined as crude methanol that has passed through a flash operation (e.g., a single-stage flash drum) to reduce the concentration of dissolved gases and other light components. Often stabilized methanol will have <1% $CO_2$ and most typically about 0.5 wt % $CO_2$. As used herein, the terms "source methanol", "initial methanol", or similar terms refer to "crude methanol", "stabilized methanol" or both. As used herein, the term "grade methanol" is defined as methanol that meets a purity standard such as the ASTM AA standard (D1152) or IMPCA methanol reference specifications.

As used herein, unless specified otherwise, the terms % and mol % are used interchangeably and refer to the moles of a first component as a percentage of the moles of the total, e.g., formulation, mixture, material or product.

As used herein, unless specified otherwise the terms weight % (abbreviated wt %) and mass % refer to the weight of a first component as a percentage of the weight of the total, e.g., formulation, mixture, material or product.

As used herein, unless stated otherwise, room temperature is 25° C., and standard temperature and pressure is 15° C. and 1 atmosphere (1.01325 bar). Unless expressly stated otherwise all tests, test results, physical properties, and values that are temperature dependent, pressure dependent, or both, are provided at standard temperature and pressure.

As used herein, unless stated otherwise, the terms "fuel-to-air equivalence ratio", "equivalence ratio", "fuel/air equivalence ratio", "φ" or "ER", and similar such terms have the same meaning and are to be given their broadest meaning and would include the ratio of the actual fuel/air ratio to the stoichiometric fuel/air ratio. The stoichiometric air/fuel ratio is that need for ideal, stoichiometric combustion to occur, which is when all the fuel and oxygen is consumed in the reaction, and the products are carbon dioxide and water.

Global Warming and Environmental Concerns

The relative harm to the environment by the release of waste gases when compared to $CO_2$, an established highly problematic gas, are shown FIG. 11.

The environmental impact in terms of global warming potential of methane slippage from flare gas and venting cannot be overstated. According to a 2019 International Energy Agency (IEA) report, about 200 billion cubic meter (bcm) of waste or flare gas were combusted or vented into the atmosphere in 2018. About 50 bcm of gas were vented, and about 150 bcm were combusted in flares. Combustion is intended to convert hydrocarbons to $CO_2$, but their peak efficiency is 98%, and that efficiency drops in the presence of wind. The combination of inefficient combustion and venting results in total $CO_2$e emissions of about 1.4 gigatons of $CO_2$e, which amounts to about 2.7% of all anthropogenic sources of $CO_2$e per year.

This Background of the Invention section is intended to introduce various aspects of the art, which may be associated with embodiments of the present inventions. Thus, the forgoing discussion in this section provides a framework for better understanding the present inventions, and is not to be viewed as an admission of prior art.

SUMMARY

There has been a long-standing, expanding and unmet need, for systems, devices and methods to separate, capture and utilize $CO_2$, $H_2$ or both from process, waste or exhaust gas streams. In particular, there is a continuing need for improvements to separate, capture and utilize $CO_2$, $H_2$ or both from gases produced during the conversion of otherwise uneconomic hydrocarbon-based fuel (e.g., stranded, associated, non-associated, landfill, flared, small-pocket, remote gas, wastewater treatment) to value-added, easily transported products (such as methanol, ethanol, mixed alcohols, ammonia, dimethyl-ether, F-T liquids, and other fuels or chemicals). The present inventions, among other things, solve these needs by providing the articles of manufacture, devices and processes taught, and disclosed herein.

Thus, there is provided systems and methods for a gas-to-liquids plant having: a primary synthesis loop at a pressure above about 30 bar; a high-pressure, process stream containing $CO_2$, after condensation and collection of liquid or easily condensable products; a $CO_2$ separator, wherein the $CO_2$ separator operates based on mechanical separation of condensed-phase (solid or liquid) $CO_2$; and capture of the $CO_2$-rich stream for subsequent use or sequestration.

There is further provided these systems and methods having one or more of the following features: wherein the gas-to-liquid plant is small scale having one or a plurality of syngas engines, targeting 600,000 scfd (standard cubic feet per day) of inlet gas. The size of such a plant could vary from 50,000 scfd to 3,000,000 scfd, or 20,000 scfd to 100,000 scfd or 250,000 scfd to 25,000,000 scfd; wherein the mechanical $CO_2$ separator comprises heat exchangers, a turbo-expander, a throttling valve, and gas-solid separator and a pump; Recycle of a $CO_2$-depleted stream to the downstream synthesis process or upstream reformer; wherein the high-pressure process stream is one of the gas-phase effluent of the product condensation and collection step or the retentate of the hydrogen separation step; wherein the $CO_2$ separator is used for syngas ratio adjustment and therefore eliminating the hydrogen separation step and replacing it with a simple splitter and purge stream; wherein the $CO_2$ separator in FIGS. 2 and 3 delivers the $CO_2$-depleted stream at high-pressure and can be recycled to the downstream synthesis process without substantial recompression; wherein the mechanical separation of condensed phase $CO_2$ uses expansion through a turbo-expander and/or valve to promote condensation/deposition via the cooling effect of gas expansion; wherein one or more recuperating heat exchangers are used to pre-cool the gas to the turbo-expander and promote melting of the dispersed-phase, solid $CO_2$; wherein a pump (e.g., progressive cavity pump or the like) is used to compress the dispersed-phase, solid $CO_2$ or a slurry containing solid and liquid $CO_2$ prior to melting; wherein the liquid $CO_2$ is re-injected at the well site for sequestration and/or enhanced oil recovery or transport of the liquid $CO_2$ via pipeline, rail tank car, tanker truck, or the like for other uses; wherein inlet air separation or syngas nitrogen rejection is used to reduce the amount of nitrogen carried through the process and therefore increase the $CO_2$ concentration, reducing the energy intensity and capital cost of the carbon capture; and, wherein power from the engine-based reformer is used to perform the separation.

Additionally, there are provided systems and methods having a small-scale gas-to-liquids plant with primary synthesis loop at a pressure above about 30 bar; a $CO_2$ separator that removes $CO_2$ from a high-pressure process stream after condensation and collection of liquid or easily condensable products, wherein the $CO_2$ separator operates based on chemical/physical separation of $CO_2$; recycle of a $CO_2$-depleted stream to the downstream synthesis process or upstream reformer; and capture and sequestration of the $CO_2$-rich stream for one or more uses.

There are further provided these systems and methods having one or more of the following features: wherein the high-pressure process stream being one of the gas-phase effluent of the product condensation and collection step or the retentate of the hydrogen separation step; wherein the use of the $CO_2$ separator for syngas ratio adjustment and therefore eliminating the hydrogen separation step and replacing it with a simple splitter and purge stream; wherein the $CO_2$ separator delivers the $CO_2$-depleted stream at high-pressure and can be recycled to the downstream synthesis process without substantial recompression; wherein the chemical/physical $CO_2$ separation method being one of membrane separation, absorption (e.g., amine stripping), adsorption, or chemical reaction (e.g., carbonate formation); wherein the re-injection of the liquid $CO_2$ at the well site for sequestration and/or enhanced oil recovery or transport of the liquid $CO_2$ via pipeline, rail tank car, tanker truck, or the like for other uses; wherein the use of inlet air separation or syngas nitrogen rejection to reduce the amount of nitrogen carried through the process and therefore increase the $CO_2$ concentration, reducing the energy intensity and capital cost of the carbon capture; and wherein the use of power from the engine-based reformer to perform the separation.

Yet further, the monetization of stranded gas resources, such as associated gas from oil production, generally requires that the gas be converted to a product or intermediate that is a liquid (e.g., methanol, FT liquids) or easily condensable gas (e.g., ammonia) at ambient temperatures. Because typically reactions like methanol and ammonia synthesis are equilibrium limited, not all the carbon and hydrogen in the syngas intermediate a converted in a single pass. Moreover, because distributed systems typically may favor robustness and simplicity over atom efficiency, the recycle ratio may be kept low resulting in lower overall carbon efficiency compared to convention, large-scale plants. In some embodiments of these distributed systems, carbon efficiencies, defined as the fraction of carbon in the incoming natural gas that is fixed in the product (e.g., methanol), may be about 50%. Of the remaining carbon balance, about 25% is CO in the unreacted syngas and 25% is $CO_2$ in the unreacted syngas. Using embodiments of the present systems and methods some or all of the carbon (CO and/or $CO_2$) in unreacted syngas can be separated and captured for a variety of uses. In an embodiment of a preferred scenario, the $CO_2$ is captured and used for enhanced oil recovery (EOR) at or near the wellsite and the unreacted CO is oxidized in an emissions control device. Removing $CO_2$ also has the advantage that it improves the stoichiometry number, S, of the recycled syngas and improves the yield and selectivity of the downstream synthesis reactor. Besides improving the reactor performance and reducing the carbon footprint of the process, carbon capture may also generate an additional revenue stream of the distributed process ($CO_2$ for EOR costs about $1-3/Mscf [thousand standard cubic feet] delivered to the wellsite) and may generate additional revenue through tax credits, incentives (e.g., US 45Q tax credit), and the like.

Moreover, there are provided systems and methods that improve on conventional, commercial methanol synthesis technology and enables small, distributed, self-sufficient applications using stranded gas.

There is further provided these systems and methods having one or more of the following features: wherein the system has a monitoring, control and data storage system that is configured to collect, record, store and transmit the amount of carbon, (as $CO_2$, C (in other forms) or both) that is sequestered, and thus not released into the atmosphere. In this manner data is obtained in a manner that can be used to obtain and support the issuance of tax credits, carbon credits and other carbon-based exchanges and trading activities.

These systems and methods provide numerous advantages and solutions to problems, among them are: 1) lowering the carbon intensity of liquid products made from a syngas intermediate resulting from engine-based reforming of stranded gas, 2) capturing $CO_2$ that can be re-injected or sold as a co-product for EOR and other uses, 3) enabling the generation of tax credits for carbon sequestration (e.g., US 45Q), 4) enabling the generation of commercial/governmental carbon offsets, 5) separating and capturing carbon in a cost-effective manner that minimizes the capital intensity and energy intensity of the process, 6) separating and capturing carbon in a cost-effective manner that takes advantage of high pressures present in the downstream liquid synthesis process.

Thus, there is provided a gas-to-liquid system with primary synthesis loop at a pressure above about 30 bar, the system including: a means for providing a high-pressure, process stream containing $CO_2$, after condensation and collection of liquid or easily condensable products; a $CO_2$ separator, wherein the $CO_2$ separator operates based on mechanical separation of condensed-phase (solid or liquid) $CO_2$; and, a means for providing for a capture of the $CO_2$-rich stream for subsequent use or sequestration.

Moreover, there is provided these systems and methods having one or more of the following features: including a means to recycle of a $CO_2$-depleted stream to the downstream synthesis process or upstream reformer; wherein the high-pressure process stream is one of the gas-phase effluent of the product condensation and collection step or the retentate of the hydrogen separation step; wherein the $CO_2$ separator is for syngas ratio adjustment and therefore eliminating the hydrogen separation step and replacing it with a simple splitter and purge stream; wherein the $CO_2$-depleted stream is at high-pressure and can be recycled to the downstream synthesis process without substantial recompression; including the mechanical separation of condensed phase $CO_2$ using expansion through a turbo-expander and/or valve to promote condensation/deposition via the cooling effect of gas expansion; including the use of one or more recuperating heat exchangers to pre-cool the gas to the turbo-expander and promote melting of the dispersed-phase, solid $CO_2$; including the use of a pump (e.g., progressive cavity pump or the like) to compress the dispersed-phase, solid $CO_2$ or a slurry containing solid and liquid $CO_2$ prior to melting; including the re-injection of the liquid $CO_2$ at the well site for sequestration and/or enhanced oil recovery or transport of the liquid $CO_2$ via pipeline, rail tank car, tanker truck, or the like for other uses; including the use of inlet air separation or syngas nitrogen rejection to reduce the amount of nitrogen carried through the process and therefore increase the $CO_2$ concentration, reducing the energy intensity and capital cost of the carbon capture; including the use of power from the engine-based reformer to perform the separation; wherein the gas-to-liquid plant is a small-scale plant; having one or a plurality of syngas engines; having a scale of from 80,000 scfd to 3,000,000 scfd; having a scale of from 20,000 scfd to 100,000 scfd; having a scale of from 250,000 scfd to 25,000,000 scfd; having a scale of from less than 25,000,000 scfd; having a scale of from less than 10,000,000 scfd; and, having a scale of from less than 5,000,000 scfd.

In addition, there is provided a method to operate a gas-to-liquid system with primary synthesis loop at a pressure above about 30 bar, the system method including: providing a high-pressure, process stream containing $CO_2$, after condensation and collection of liquid or easily condensable products; separating $CO_2$ based on mechanical separation of condensed-phase (solid or liquid) $CO_2$; and, providing for a capture of the $CO_2$-rich stream for subsequent use or sequestration.

Still further this is provided a small-scale gas-to-liquid plant with primary synthesis loop at a pressure above about 30 bar, The plant including: a $CO_2$ separator that removes $CO_2$ from a high-pressure process stream after condensation and collection of liquid or easily condensable products, wherein the $CO_2$ separator operates based on chemical/physical separation of $CO_2$; recycle of a $CO_2$-depleted stream to the downstream synthesis process or upstream reformer, and; capture and sequestration of the $CO_2$-rich stream for one or more uses.

Moreover, there is provided these systems and methods having one or more of the following features: including wherein the high-pressure process stream is one of the gas-phase effluent of the product condensation and collection step or the retentate of the hydrogen separation step; including the use of the $CO_2$ separator for syngas ratio adjustment and therefore eliminating the hydrogen separation step are replacing it with a simple splitter and purge stream; wherein the $CO_2$-depleted stream is at high-pressure and can be recycled to the downstream synthesis process without substantial recompression; wherein the chemical/physical $CO_2$ separation method is one of membrane separation, absorption (e.g., amine stripping), adsorption, or chemical reaction (e.g., carbonate formation); wherein the liquid $CO_2$ is re-injected at the well site for sequestration and/or enhanced oil recovery or transported via pipeline, rail tank car, tanker truck, or the like for other uses; including the use of inlet air separation or syngas nitrogen rejection to reduce the amount of nitrogen carried through the process and therefore increase the $CO_2$ concentration, reducing the energy intensity and capital cost of the carbon capture; and including the use of power from the engine-based reformer to perform the separation.

BRIEF DESCRIPTION OF THE DRAWINGS

FIG. 11 is a table showing global warming potential values.

DESCRIPTION OF THE PREFERRED EMBODIMENTS

Figure 1:
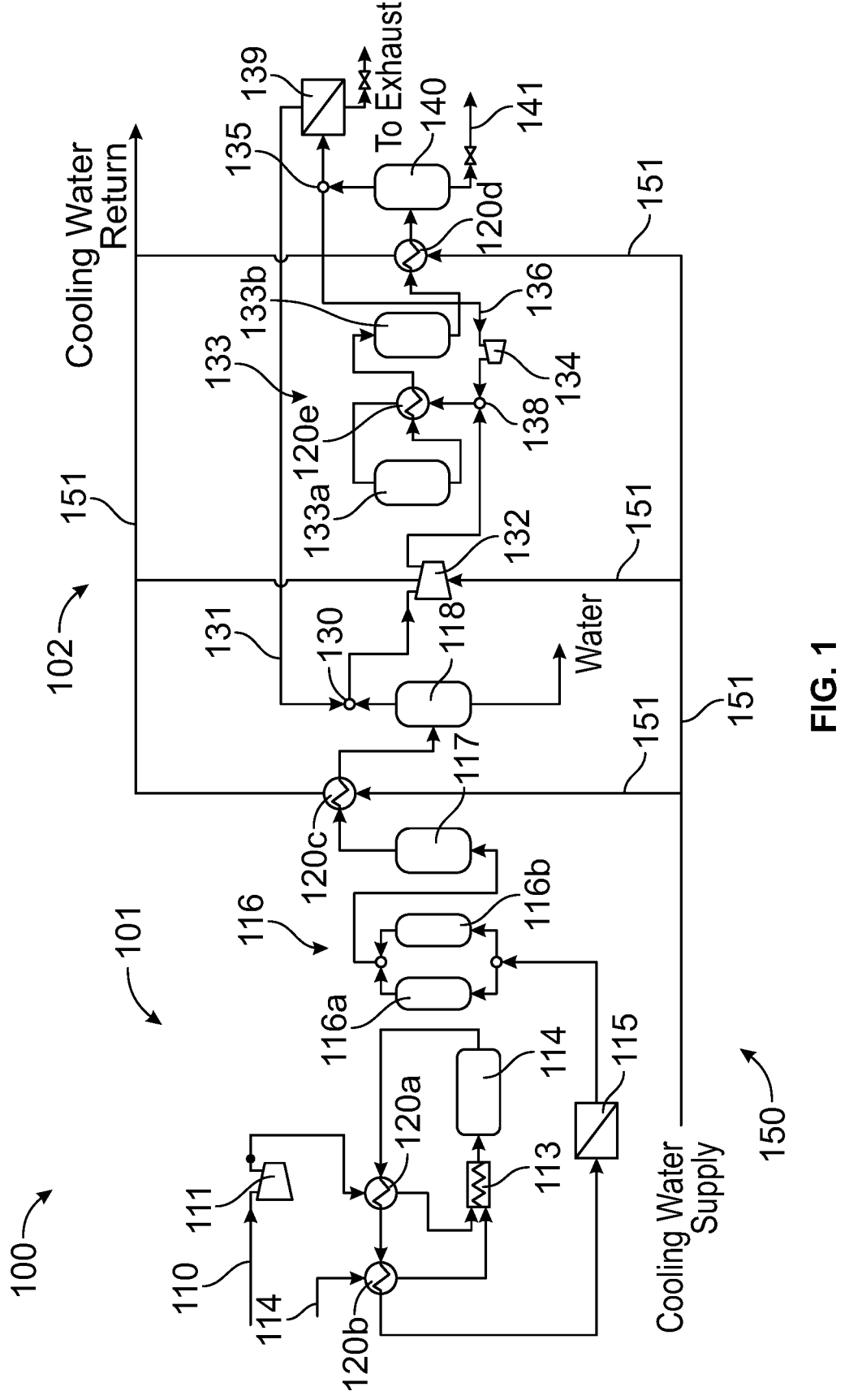
FIG. 1 is a schematic and process flow diagram of an embodiment of a system for converting otherwise uneconomic hydrocarbon-based fuel, e.g., flare gas to methanol, which may further have carbon capture, utilization & storage ("CCUS") (not shown in the figure), in accordance with the present inventions.

In general, the present inventions relate to carbon capture, utilization & storage ("CCUS") devices, systems and methods. Thus, embodiments of the present inventions generally relate to systems, devices and methods to recover and utilize $CO_2$ from gas streams, and in particular process, exhaust or waste gas streams containing $CO_2$, and in particular containing high amounts of $CO_2$. In an embodiment, the present inventions relate to the separation and recovery of $CO_2$ from gas streams created during the conversion of an otherwise uneconomic hydrocarbon-based feedstock e.g., flare gas, to a high value product, e.g., methanol.

In general, the present inventions relate to hydrogen capture, utilization & storage devices, systems and methods. Thus, embodiments of the present inventions generally relate to systems, devices and methods to recover and utilize $H_2$ from gas streams, and in particular exhaust or waste gas streams containing hydrocarbons and $CO_2$, and in particular containing high amounts of $CO_2$.

In an embodiment, the present inventions relate to the separation and recovery of $H_2$, $CO_2$, or both from gas streams created during the conversion of an otherwise uneconomic hydrocarbon-based feedstock, e.g., flare gas, to a high value product, e.g., methanol. Any of the CCUS systems, devices and methods disclosed herein can be used with systems, devices and methods to convert otherwise uneconomic hydrocarbon-based feedstocks (e.g., stranded, associated, non-associated, landfill, flared, small-pocket, remote gas, waste water treatment) to value-added, easily transported products (such as methanol, ethanol, ammonia, dimethyl-ether, F-T liquids, and other fuels or chemicals). Thus, these CCUS systems, devices and methods can be used with gas-to-liquid systems and methods, such as those taught and disclosed in US patent publication no. 2022/0388930 and in U.S. patent application Ser. No. 17/953,056 (filed Sep. 26, 2022), the entire disclosure of each of which is incorporated herein by reference.

The present inventions generally find considerable advantages in their application to gas streams having about 3% $CO_2$ to about 85% $CO_2$, about 5% $CO_2$ to about 50% $CO_2$, about 15% $CO_2$ to about 65% $CO_2$, about 25% $CO_2$ to about 75% $CO_2$, more that about 5% $CO_2$, more than about 15% $CO_2$, more than about 25% $CO_2$, more than about 35% $CO_2$, and lower and higher amounts. The present inventions generally find considerable advantages in their application to gas streams having about 3% $H_2$ to about 85% $H_2$, about 5% $H_2$ to about 50% $H_2$, about 15% $H_2$ to about 65% $H_2$, about 25% $H_2$ to about 75% $H_2$, more that about 5% $H_2$, more than about 15% $H_2$, more than about 25% $H_2$, more than about 35% $H_2$, and lower higher amounts. The present inventions also generally find considerable advantages in their application to gas streams having both of any one of the foregoing amounts of $CO_2$ and $H_2$.

Embodiments of the present invention provide for reduced or zero $CO_2$ emissions by capturing the $CO_2$ that would otherwise go up the exhaust stack. There are provided several methods and systems to remove $CO_2$ from the stack, for example: (a) Mechanical separation: due to the high pressure of the synthesis process, a turbo-expander can be used to simultaneously lower the pressure to near ambient and reduce the temperature below the solidus line of $CO_2$ (dry ice temperature of −78.5° C. at ambient pressure) or liquidus line of $CO_2$ forming a condensed $CO_2$ phase that can be separated for the bulk gas, (b) Chemical/Physical separation: prior to the exhaust stack, the $CO_2$ is removed by chemical process such as an amine-based solvent and the like. The separated $CO_2$ can be sequestered on-site (via re-injection) optionally for enhanced oil recovery (EOR), or sold as a commercial product (EOR, refrigeration, industrial processes (surface processing), chemical synthesis, beverages, etc.).

Generally, an embodiment of the present inventions reduces the carbon emissions for synthesis of methanol (or other downstream product such as ammonia, DME or F-T liquids) in an integrated system with an engine-based reformer for small, modular, distributed conversion of stranded gas to products, such as those taught and disclosed in US patent publication no. 2022/0388930 and in U.S. patent application Ser. No. 17/953,056 (filed Sep. 26, 2022) and Ser. No. 17/984,126 (filed Nov. 9, 2022), the entire disclosure of each of which is incorporated herein by reference.

Reducing the carbon emissions (also quantified as the carbon intensity defined as the carbon emissions per unit of downstream product, e.g., methanol) reduces the environmental footprint of the process and supports efforts to mitigate climate change. In embodiments, carbon emissions are reduced by separating carbon dioxide ($CO_2$) from the exhaust gas byproduct and either sequestering the $CO_2$ or using it for another purpose. $CO_2$ has many industrial uses, with EOR principal among them, and is estimated to have a value of $1-3/Mscf delivered to a well site. As such, $CO_2$ can represent a revenue generating co-product if the added value of capturing the carbon can be justified by the additional capital and operating costs. Capturing and sequestering carbon can also provide revenue through tax credits and the sale of commercial or governmental carbon offsets. In particular, embodiments relate to processes for reducing carbon emissions that exploit inherent features of the integrated system with the engine-based reformer, such as the availability of power (e.g., shaft power, electrical power, or pneumatic/hydraulic pressure) from the reformer and the high pressure in the exhaust byproduct stream of the downstream synthesis process.

Although this specification focuses on methanol synthesis as an example, it is understood that the present CCUS methods and systems have applicability to other similar downstream synthesis processes. Thus, and in general, embodiments of the present CCUS methods and system find application in, and can be used with or in conjunction with, systems and methods for the conversion of otherwise uneconomic hydrocarbon-based fuel (e.g., stranded, associated, landfill, flared, small-pocket, remote gas) to value-added, easily transported products (such as methanol, ethanol, mixed alcohols, ammonia, dimethyl-ether, F-T liquids, and other fuels or chemicals) using an autonomous, modular system. It is further understood that embodiments of the present invention can apply to conversion of economic (e.g., pipeline natural gas) as well as uneconomic hydrocarbon-based fuels.

Turning to FIG. 1 there is shown a generalized embodiment of a system and method for the conversion of a waste gas, e.g., flare gas, into a value-added product, e.g., methanol, without CCUS. The system 100 has a reformer stage 101 and a synthesis stage 102. The system 100 has an air intake 110, that feeds air through into a compressor 111, which compresses the air. The compressed air is feed through heat exchanger 120a into a mixer 113. The system has a waste gas, e.g., flare gas, intake 114. The waste gas flows through a heat exchanger 120b into the mixer 113. The mixer 113, provides a predetermined mix of air and waste gas, as taught and disclosed in this specification, to a reformer 114.

The fuel-air mixture that is formed in mixer 113 is preferably rich, more preferably having an overall fuel/air equivalence ratio (0 or ER) greater than 1, greater than 1.5, greater than 2, greater than 3, from about 1.5 to about 4.0, about 1.1 to about 3.5, about 2 to about 4.5, and about 1.1 to about 3, and greater values.

It is understood that oxygen can be added to the air. Water or steam may also be injected into the mixture of air and fuel, or to air or fuel individually. From about 1 to about 20% (molar) water can be injected, from about 10 to about 15% (molar water), from about 5 to about 17% (molar) water, more than 5% (molar) water, more than 10% (molar) water, more than 15% (molar) water, and less than 25% (molar) water, water can be injected. Following oxygen enrichment, the combustion air can have from about 21% (molar) to about 90% (molar) oxygen. "Air-breathing" reformers, and air breathing engines as used herein are understood to also include engines using air modified with the addition of water, oxygen or both.

The reformer 114 partially combusts the predetermined mixture of waste gas and air (e.g., flare gas and air) to form a reprocessed gas (e.g., syngas). The syngas flows through heat exchangers 120a, 120b and into a filter 115, e.g., a particulate filter.

After passing through the filter 115, the reprocessed gas (e.g., syngas) flows to a guard bed reactor assembly 116, optionally having two guard bed reactors 116a, 116b. The guard bed reactor 116 has materials, e.g., catalysts, that remove contaminates and other materials from the syngas that would harm, inhibit or foul later apparatus and processes in the system. For example, the guard bed reactor 116 may contain catalyst, adsorbents, or other materials to remove sulfur (e.g., iron sponge, zinc oxide or similar) and halogenated compounds. Optionally the guard bed can instead be placed in the waste gas intake line 114.

After leaving the guard bed reactor 116, the reprocessed gas (e.g., syngas) flows to a deoxygenation (deoxo) reactor 117. The deoxo reactor 117 removes excess oxygen from the reprocessed gas (e.g., syngas) by oxidizing combustible compounds in the mixture such as methane, CO, and $H_2$, where the oxygen is converted to water. Catalyst for the deoxo reaction are platinum, palladium, and other active materials supported on alumina or other catalyst support materials.

The system 100 has a cooling system 150, which uses a cooling fluid, e.g., cooling water, that is flow through cooling lines, e.g., 151. Other means of cooling, for example direct air cooling, are also contemplated.

After leaving the deoxo reactor 117, the reprocessed gas (e.g., syngas) flows to heat exchanger 120c. The reprocessed gas (e.g., syngas) then flows from heat exchanger 120c to a water removal unit 118, e.g., a water knockout drum, demister, dryer, membrane, cyclone, desiccant or similar devices, where water is removed from the reprocessed gas (e.g., syngas). In general, the reprocessed gas (e.g., syngas) upon leaving unit 118 should have less than about 5% water by weight, less than about 2%, less than about 1% and less than about 0.1% water.

The overall (general) reaction for a rich fuel/air mixture to syngas is given by the equation:

$$\phi CH_4 + 2[O_2 + 3.76N_2] \rightarrow aCO + bH_2 + cCO_2 + dH_2O + 7.52N_2$$

Where stoichiometric coefficients a, b, c and d are determined by the chemical kinetics, conservation of atomic species, and the reaction conditions.

In addition to syngas minor constituents in the gas exiting the reformer can include water vapor, $CO_2$, and various unburned hydrocarbons.

After leaving unit 118, the now dry reprocessed gas (e.g., syngas) is in the synthesis stage 102. In stage 102 the now dry reprocessed gas (e.g., syngas) flows to an assembly 130. Assembly 130 provides for the controlled addition of hydrogen from line 131 into the now dry reprocessed gas (e.g., syngas). In this manner the ratio of the syngas components can be adjusted and controlled to a predetermined ratio. The hydrogen is provided from hydrogen separation unit 139. The ratio-adjusted dry reprocessed gas (e.g., syngas) leaves assembly 130 and flow to compressor 132. Compressor 132 compresses the reprocessed gas (e.g., syngas) to an optimal pressure as taught and disclosed in this specification, for use the synthesis unit 133. Optionally, the synthesis unit 133 is a two-stage unit with a first reactor unit 133a and a second reactor unit 133b. Each reactor is a pressure vessel where process gas flows through a catalyst bed in an exothermic reaction. The catalyst bed tubes are typically emersed in a pool of cooling water at a controlled temperature and pressure. Synthesis unit 133 also has heat exchanger 120e.

The synthesis unit 133 converts the ratio-adjusted dry reprocessed gas (e.g., syngas) into a value-added product (e.g., methanol, ethanol, mixed alcohols, ammonia, dimethyl-ether, F-T liquids, and other fuels or chemicals). The value-added product (e.g, methanol, etc.) flows into to heat exchanger 120d. The value-added product (e.g, methanol, etc.) flows to a collection unit 140. The collection unit 140 collects the value-added product (e.g., methanol, etc.) and flows it through line 141 for sale, holding, or further processing.

Generally, the syngas is compressed to a pressure of about 15 to about 100 bar and preferably 30-50 bar, and about 25 to about 80 bar, at least about 10 bar, at least about 25 bar and at least about 50 bar, and greater and lower pressures. The temperature of the pressurized syngas is adjusted to a temperature of about 150° C. to about 350° C. and preferably 250° C., about 200° C. to about 300° C., about 250° C. to about 375° C., greater than 125° C., greater than 150° C., greater than 200° C., greater than 250° C., greater than 350° C., and less than 400° C., and higher and lower temperatures. The pressure and temperature-controlled syngas is then feed to reactors for transforming the syngas into a more useful, more easily transportable, and economically viable product such as methanol, ethanol, mixed alcohols, ammonia, dimethyl-ether, F-T liquids, and other fuels or chemicals. In a preferred embodiment methanol is produced using the reaction of syngas to methanol, reactions for hydrogenation of CO, hydrogenation of $CO_2$, and reverse water-gas shift using actively cooled reactors, such as a heat-exchanged reactor or boiling water reactor, and a copper containing catalyst such as $Cu/ZnO/Al_2O_3$ or the like. In general, embodiments of the methanol synthesis can use the following reactions:

$$CO + 2H_2 \rightarrow CH_3OH \text{ (CO hydrogenation)}$$

$$CO_2 + 3H_2 \rightarrow CH_3OH + H_2O \text{ (CO}_2 \text{ hydrogenation)}$$

$$CO + H_2O \rightarrow CO_2 + H_2 \text{ (water-gas shift)}$$

Generally, and in preferred embodiments, the characteristic length scale of the reactors used in this system are sufficiently small (e.g., micro-channel or mini-channels) that they can be shaped into unconventional shapes and topologies using new 3D printing techniques for metals and other high-temperature materials, thus allowing compact packaging and tight control over reaction conditions. Other strategies for intensification of the downstream synthesis reactions can also be considered, such as selectively removing the product from the reactor in-situ, or in a closely coupled fashion, to shift the equilibrium-limited reaction to higher conversion. This process intensification may minimize the need for large recycle streams or allow the reaction to proceed at milder conditions (e.g., lower pressure) thereby increasing process safety margins and providing other benefits.

Typically, in reacting the syngas to form the higher value product, unreacted $H_2$ is also produced. The $H_2$ can be collected and sold, or used to power the gas turbine or a second generator to produce additional electric power.

In general, the ratio of $H_2/CO$ in the syngas produced by the engine can be tailored to the downstream conversion process. For example, for methanol synthesis or Fischer-Tropsch (F-T) synthesis the ideal $H_2/CO$ ratio is 2-3. For ammonia synthesis or for hydrogen production, the maximum possible $H_2/CO$ ratio is desirable and can be enhanced by, for example, steam addition to promote the water-gas shift reaction. For ammonia and hydrogen production, the CO is not required by the downstream synthesis. As such, CO and $CO_2$ byproducts can be collected, sequestered, stored or utilized for other purposes.

The collection unit 140 also has a line that flows gas separated from the value-added product (e.g., methanol, etc.)

to valve 135, where it is sent to hydrogen separation unit 139, to a recycle loop 136 or both. The recycle loop has compressor 134 and tee-connector 138 to feed the unreacted gas back into the synthesis unit 133. Hydrogen separation can be achieved by via membrane separation or pressure swing absorption (PSA) or the like in the hydrogen separation unit 139.

In the system 100 an air-breathing engine reformer (having one or more reciprocating engines, turbines or both) produces a syngas intermediate that is further converted to methanol in a downstream synthesis step. In this embodiment, roughly half of the carbon in the incoming natural gas is converted to methanol, a quarter is CO in the unreacted tailgas stream marked "To Exhaust" and a quarter is $CO_2$ in the same stream. Therefore, the carbon efficiency of the baseline process is roughly 50%. The methanol synthesis step takes place at high pressure (nominally 50 bar), and so the downstream streams are available at high pressure, e.g., nominally about 50 bar, at least about 30 bar, from about 20 to about 100 bar, and higher and lower pressures. The hydrogen separation unit 139 is, for example, a pressure-driven device (e.g., membrane or PSA unit) and therefore involves a substantial pressure drop, so the permeate (hydrogen-rich) stream 131 is at relatively low-pressure (nominally 10 bar, and can be from about 5 bar to about 20 bar, less than 3 bar, less than 1 bar and higher and lower pressures), while the retentate (hydrogen-depleted) stream remains at high pressure. Availability of the retentate stream at high pressure are leveraged for use with embodiments of the present $CO_2$ separation units to form CCUS systems. The CCUS systems and processes of FIGS. 2 to 4, and the $CO_2$ separation unit of FIG. 5, and combinations and variations of these can be used with the system of FIG. 1.

Hydrogen separation can be achieved by via membrane separation or pressure swing absorption (PSA) or the like in a Hydrogen Separation Unit. Criteria for selection of the technology for a particular gas-to-liquids systems include scale, cost, maintenance, and overall separation efficiency. Separation using membrane results in the hydrogen-rich stream at lower pressure compared to a PSA and requires additional recompression work when used as part of a recycle loop, however the membrane is mechanically simpler and may be less expensive at some scales.

Figure 2:
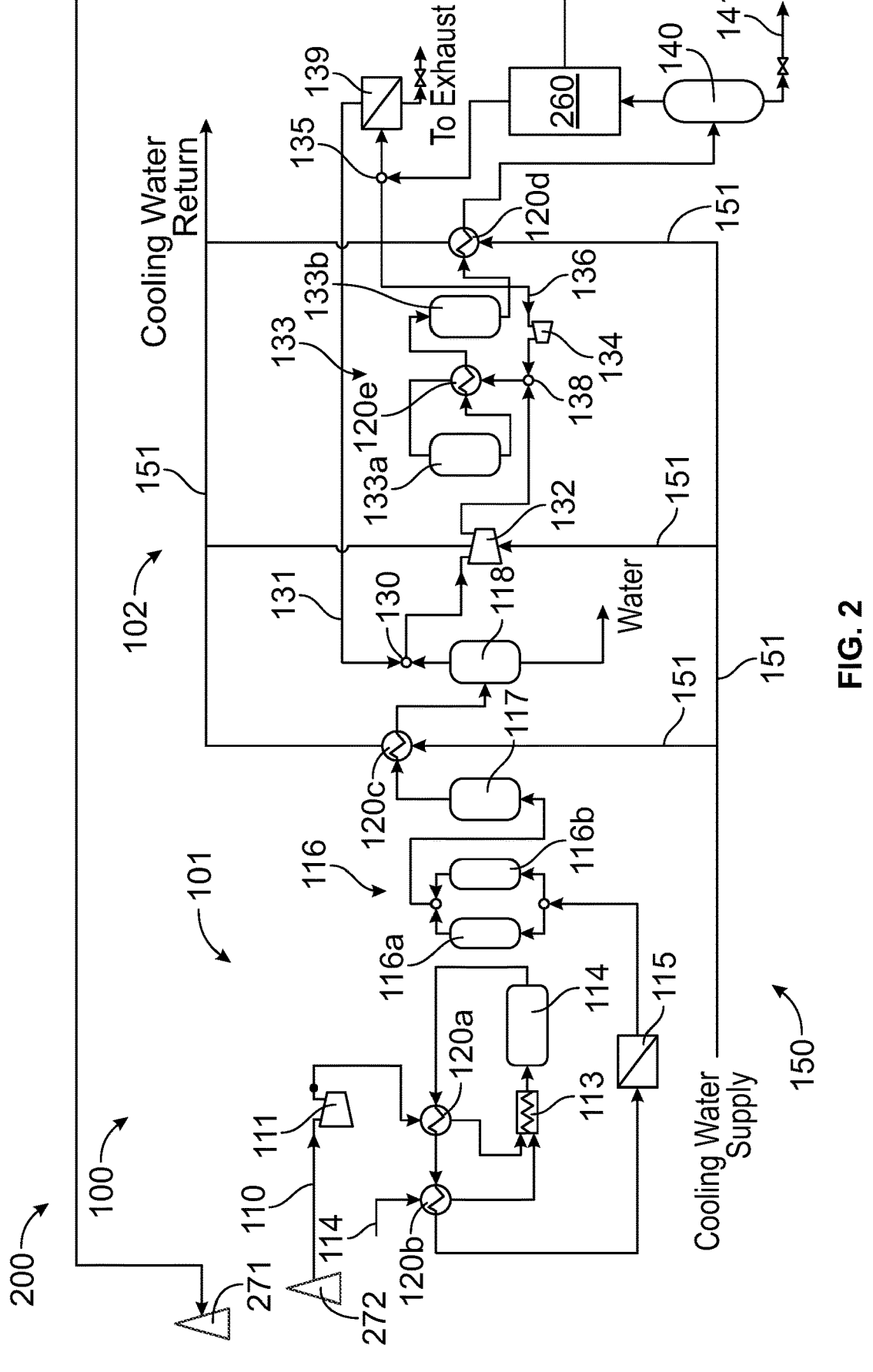
FIG. 2 is a schematic and process flow diagram of an embodiment of a system for converting otherwise uneconomic hydrocarbon-based fuel. e.g., flare gas to methanol having an embodiment of CCUS having a hydrogen separator downstream from the $CO_2$ separator, where the separated $CO_2$ is used for re-injection for stimulating the production well for enhanced oil recovery (EOR) or transport via pipeline (or other mode of shipment) for storage or other uses and where the permeate (hydrogen-rich) stream (low pressure) from the hydrogen separation is used to adjust the syngas gas ratio in accordance with the present inventions.

Turning to FIG. 2 there is shown a generalized embodiment of a CCUS system and method 200 having the gas-to-liquid system and process of FIG. 1 (like structures having like numbers). In this system 100 an air-breathing engine reformer (having one or more reciprocating engines, turbines or both) produces a syngas intermediate that is further converted to methanol in a downstream synthesis step. An injection well 271 for injecting the recovered $CO_2$ and a production well 271 for providing the flare gas are shown. The CCUS system 200 has a $CO_2$ separator 260 that receives the gas-phase effluent stream (high pressure) of the methanol condensation and collection step and separates this stream into two streams, a $CO_2$-rich stream 261 (e.g., about 50 bar pressure) for use in EOR, storage or both and a $CO_2$ depleted stream (e.g., less than 2% $CO_2$, less than 1% $CO_2$, less than 0.1% $CO_2$), which is high pressure (e.g., nominally about 50 bar, at least about 30 bar, from about 20 to about 100 bar, and higher and lower pressures), and used to feed the hydrogen separation unit 139. In this embodiment, $CO_2$ separation methods that do not lead to a substantial pressure drop are preferred because the hydrogen separation requires high pressure and recompression of the recycle syngas is undesirable. As such, this embodiment favors chemical/physical $CO_2$ separation methods over mechanical $CO_2$ separation methods. However, compressors can be used to achieve the desired pressure for the $H_2$-rich recycle stream 131 from the hydrogen separation unit 139, based upon the type of $CO_2$ separation unit and hydrogen separation unit. The $CO_2$ product can be re-injected on-site (injection well 271) or transported via pipeline, rail tank car, or tanker truck for industrial or other use. In a preferred embodiment, the $CO_2$ is used substantially close to the wellsite to minimize transportation costs. The $CO_2$-depleted stream feeds the hydrogen separation process, which improves its performance and minimizes its capital costs.

It is preferred to minimize the compression work for the $H_2$-recycle stream which favors configurations that either minimize the pressure loss of the recycle stream through the hydrogen separation and $CO_2$ separation units or minimize the flow of undesired constituents in that stream. Furthermore, placing the hydrogen separation upstream of the $CO_2$ separation may reduce the size and cost of the $CO_2$ separator. Similarly, placing the $CO_2$ separator upstream of the hydrogen separator may reduce the size and cost of the hydrogen separator. The preferred configuration is that one that minimizes the total cost of ownership and other metrics.

The retentate stream 261 for the hydrogen separator in FIG. 2 is at high pressure and can be used as additional source of electrical or shaft power through use of a turbo-expander.

Figure 3:
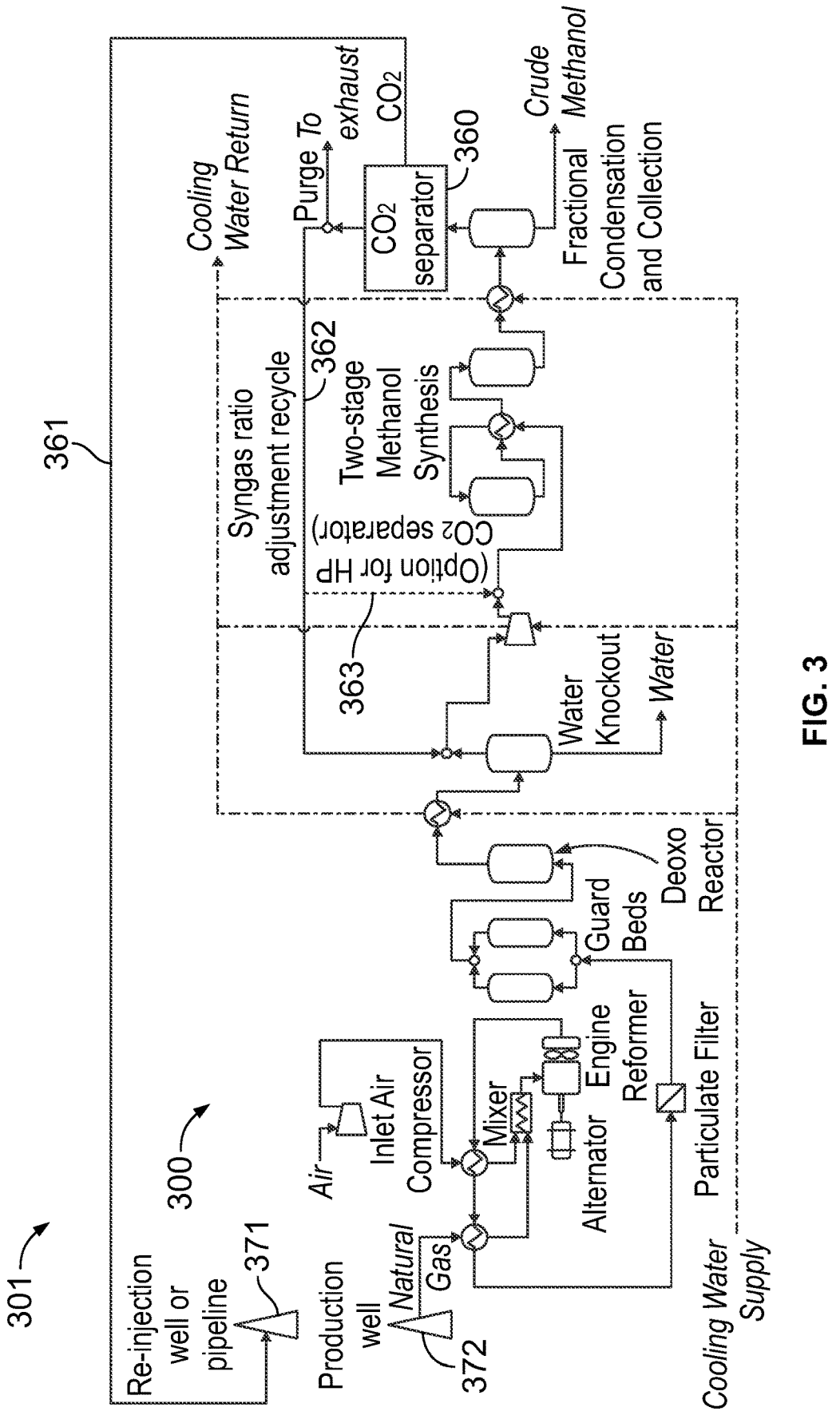
FIG. 3 is a schematic and process flow diagram of an embodiment of CCUS (without the unit operation of hydrogen separation) where the $CO_2$-depleted effluent stream is used to adjust the syngas ratio and the $CO_2$-enriched effluent stream is used for re-injection for stimulating the production well for enhanced oil recovery (EOR) or transport via pipeline (or other mode of shipment) for storage or other uses in accordance with the present inventions.

Turning to FIG. 3, there is shown a generalized embodiment of a CCUS system and method 301 having gas-to-liquid system and process 300 of the type general shown and described in FIG. 1. The CCUS system 301 has a $CO_2$ separator 360 that receives the gas-phase effluent stream (at near-reactor pressure) of the methanol condensation and collection step and separates this stream into two streams, a $CO_2$ rich stream 361 (about 50 bar pressure) for use in EOR (e.g., with injection well 371), storage or both and a $CO_2$ depleted stream (e.g., less than 2% $CO_2$, less than 1% $CO_2$, less than 0.1% $CO_2$), which is at moderate-to-high (e.g., about 50 bar, at least about 30 bar, at least 10 bar, at least 5 bar, from about 20 to about 100 bar, and higher and lower pressure) and used to adjust the syngas ratio (lines 362, 363). The flare gas is received from well 372. This $CO_2$ depleted stream will have constituents including nitrogen, hydrogen, and carbon monoxide. In this embodiment, the hydrogen separation is not used with the $CO_2$ separator, as thus the $CO_2$ separator also provides a gas stream that is used in performing syngas ratio adjustment. Proper ratio of $H_2$, CO, and $CO_2$ is useful for performance (i.e., yield and selectivity) of the methanol synthesis process. This ratio is quantified by the stoichiometry number, S, defined as $$S=(H_2-CO_2)/(CO+CO_2),$$

where the numbers on the right are molar flow rates or mole fractions for the syngas stream entering the methanol synthesis reactor. For syngas with negligible amounts of $CO_2$ (e.g., from conventional steam-methane reformers with water-gas shift reactors), this ratio reduces to the $H_2$/CO ratio. However, for partial-oxidation reformers such as air-breathing engine reformers, the $CO_2$ fraction is non-negligible. Stoichiometry numbers slightly above 2 (S>2) are preferred to ensure good selectivity and yield of the methanol synthesis process. Lower stoichiometry numbers (S<2) lead to the formation of byproducts and complicate the downstream separations. Nascent syngas from the reformer has a lower value of S than desired. Syngas ratio adjustment refers to separations or other methods to adjust S. The hydrogen separation, for example as shown in the embodiment of FIG. 1 serves to increase S by enriching the recycle stream (i.e., the permeate stream) in hydrogen, such that when it mixes with the incoming syngas from the reformer, S is substantially equal to 2 in the reactor feed. Alternatively, $CO_2$ can be removed from the syngas recycle stream to increase S, by both increasing the term in the numerator and decreasing the term in the denominator. In the embodiment of FIG. 3, the $CO_2$ separator functions both for carbon capture and for syngas ratio adjustment. In this embodiment the hydrogen separator has been eliminated and replaced with a simple stream splitter and purge stream. The purge stream is required to eliminate inert gases (e.g., nitrogen) and surplus CO and other gases from the process.

The exhaust/purge stream in FIG. 3 is at high pressure and can be used as additional source of electrical or shaft power through use of a turbo-expander, or similar device.

Figure 4:
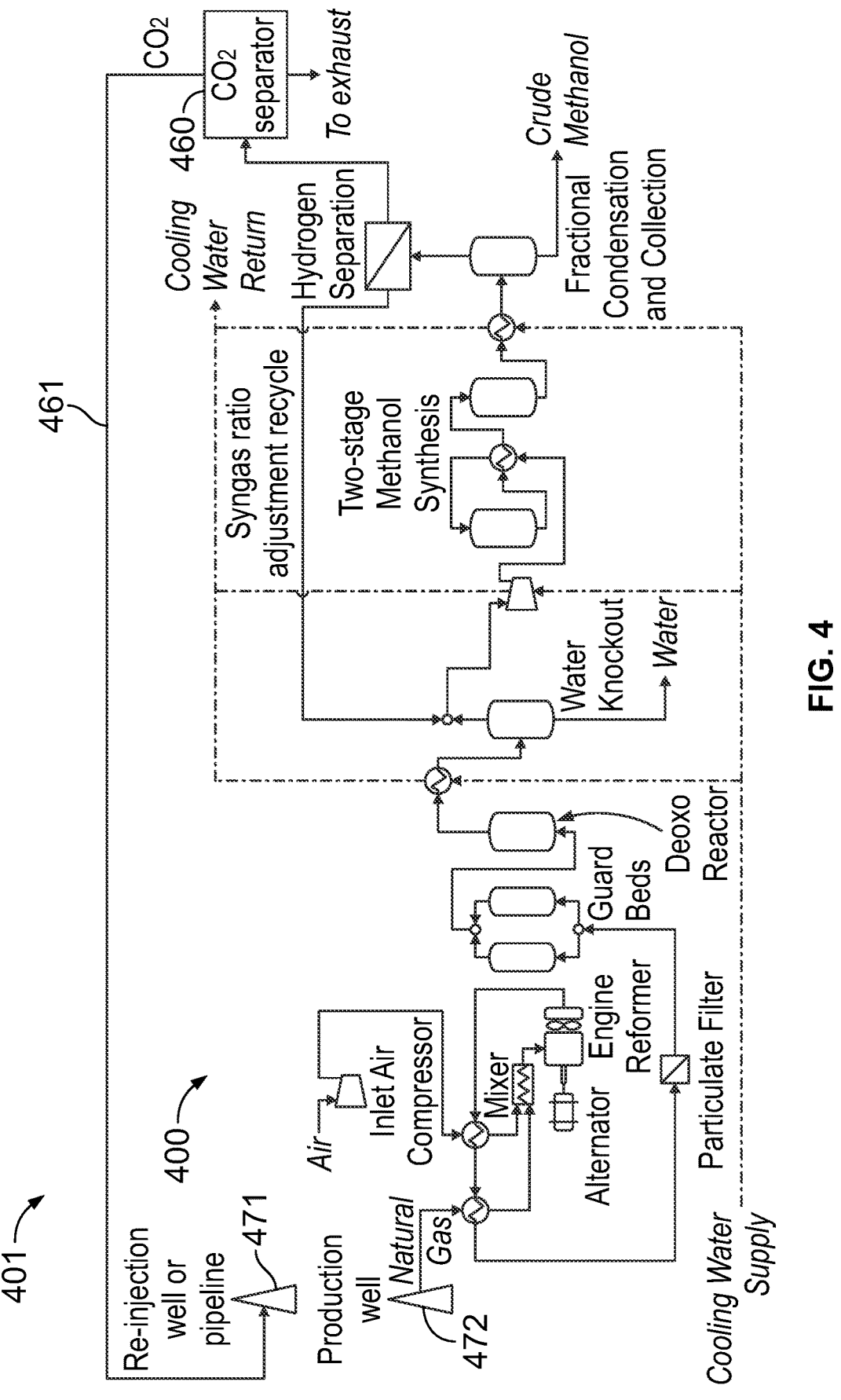
FIG. 4 is a schematic and process flow diagram of an embodiment of CCUS with hydrogen separation upstream of the $CO_2$ separation, where the recovered $CO_2$ is used for re-injection to stimulate the production well for enhanced oil recovery (EOR) or transport via pipeline (or other mode of shipment) for storage or other uses and where the permeate (hydrogen-rich) stream (low pressure) is used to adjust the syngas gas ratio in accordance with the present inventions and the retentate (hydrogen-depleted) stream (high pressure) is used to feed the $CO_2$ separation unit.

Turning to FIG. 4, here is shown a generalized embodiment of a CCUS system and method 401 having gas-to-liquid system and process 400 of the type general shown and described in FIG. 1. The CCUS system 401 has a Hydrogen separator that receives the gas-phase effluent stream (near-reactor pressure) of the methanol condensation and collection step and separates this stream into two streams, the hydrogen-rich, low-pressure permeate stream that is recycled back into the process to adjust the syngas ratio; and, the hydrogen-depleted, high-pressure retentate stream that feeds the $CO_2$ separator 460. The $CO_2$ separator 460 separates the hydrogen-depleted, high-pressure retentate stream into two streams, a $CO_2$ rich stream 461 (at about 50 bar pressure) for use in EOR (e.g., injection well 471), storage or both (higher pressures may also help in economics of transport through pipelines, filling tanker trucks/rail cars and other downstream activities) and a $CO_2$ depleted stream (e.g., less than 2% $CO_2$, less than 1% $CO_2$, less than 0.1% $CO_2$), that is exhausted. The flare gas is received from well 472. The exhaust/purge stream in FIG. 3 is at high pressure and can be used as additional source of electrical or shaft power through use of a turbo-expander, or similar device. Thus, in this embodiment the hydrogen separator is upstream from the $CO_2$ separator 460; incorporating $CO_2$ separation in the retentate stream of the hydrogen separation step. In this embodiment, the high pressure in the retentate stream can be exploited to minimize the energy requirements for the $CO_2$ separation. As this stream is exiting the process and requires expansion to near atmospheric pressure anyway, no recompression is required. As such, this configuration is particularly well-suited to processes with a substantial pressure drop, such as the mechanical separation process described in detail in FIG. 5. The $CO_2$ product can be re-injected on-site or transported via pipeline, rail tank car, or tanker truck for industrial or other use. In a preferred embodiment, the $CO_2$ is used substantially close to the wellsite to minimize transportation costs. This embodiment does not affect the syngas recycle stream and therefore does not impact the stoichiometry number, S.

Figure 5:
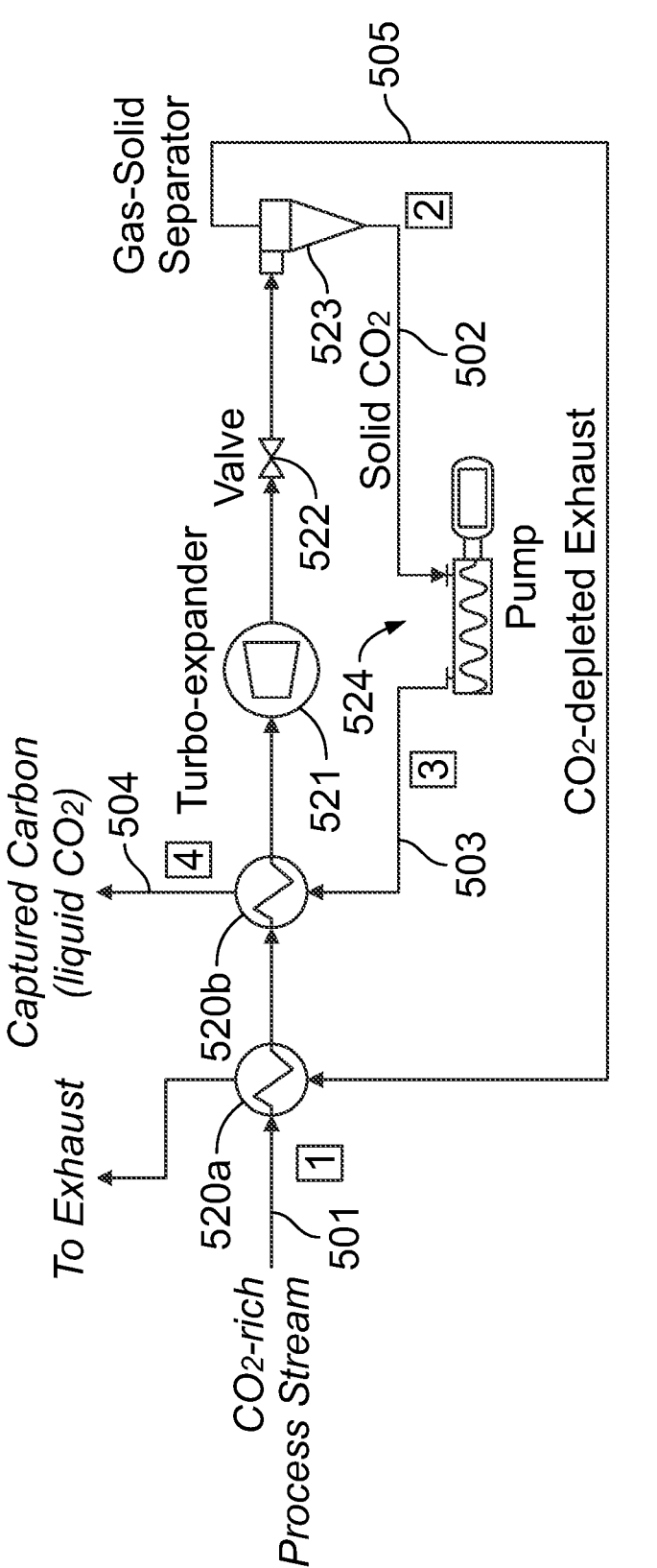
FIG. 5 is schematic and process flow diagram of an embodiment of a $CO_2$ separation unit for use in CCUS, for an embodiment of a $CO_2$ separator block using deposition-based carbon capture (DBCC), consisting of mechanical $CO_2$ separation via a turbo-expander and throttle valve to reduce the stream temperature such that $CO_2$ is converted directly from gas phase to solid form, in accordance with the present inventions. The CCUS may be used with any system, such as the embodiments of FIGS. 2 to 4, that can provide a $CO_2$ rich process stream.

Turning to FIG. 5, there is shown an embodiment of a mechanical $CO_2$ separator unit and process. The embodiment of FIG. 5 is an example of units that can be used as the "$CO_2$ separator" in the embodiments of the CCUS systems of FIGS. 2-4, and preferably in the embodiment of the CCUS system of FIG. 4. Further, this $CO_2$ separator can be used with any of the systems and methods taught and disclosed in US patent publication no. 2022/0388930 and in U.S. patent application Ser. No. 17/953,056 (filed Sep. 26, 2022), the entire disclosure of each of which is incorporated herein by reference.

In the process and unit of the embodiment of FIG. 5, a $CO_2$-rich stream 501, such as the retentate from the hydrogen separation step, e.g., the retentate from the hydrogen separator of the embodiment of FIG. 4, is first cooled in a series of two recuperators 520a, 520b. The pre-cooled gas is then expanded through a turbo-expander 521. Work produced in the turbo-expander can be used in other parts of the process (e.g., to power syngas compressors). Optionally, a throttling valve 522 can be used downstream of the turbo-expander 521 to perform the final part of the expansion to avoid deposition of solid $CO_2$ in the turbo-expander 521, which may impact the maintenance interval of the turbomachine. The low temperatures (e.g., <100° C.) lead to the deposition (also known as frosting or de-sublimation) of solid $CO_2$ particles dispersed in the bulk gas phase. The solid $CO_2$ particles (i.e., "dry ice snow") are then separated from the bulk gas in a solid-gas separator 523. The solid-gas separator 523 may be a cyclone, impactor, electrostatic precipitator, or the like. The solid $CO_2$ particles are then conveyed away (line 502) and compressed to high pressure. The solid $CO_2$ compression device and step 524 may be a ram feeder, screw feeder, piston pump, or slurry pump. In a preferred embodiment, the work of compression begins to melt the $CO_2$ producing a slurry that is more easily pumped in a slurry pump such as a progressive cavity pump. The compression work is minimal given the low compressibility of condensed phases. The solid $CO_2$ particles or solid/liquid $CO_2$ slurry is passed (via line 503) through the other side of a recuperator 520b to pre-cool the incoming stream. Similarly, the gas-phase stream (line 505) exiting the solid-gas separator 523 is also passed through the other side of a recuperator 520a to pre-cool the incoming stream. Solid $CO_2$ melts completely in the recuperator and liquid $CO_2$ is produced for re-injection or other purposes described previously. This $CO_2$ separation strategy is intended to exploit high pressure available in the process stream. This part of the process is a net exporter of shaft power (i.e., the power produced in the turbo-expander more than offsets the power required in the pump). And the cooling duty is provided by recuperation of the exit streams. As such, it is expected that no external utilities are required in this portion of the process, rather the stored energy in the high-pressure process stream is used to perform the separation. The captured $CO_2$ leaves the system (via line 504) for utilization/storage as described herein.

In a preferred embodiment, embodiments of the present CCUS methods and system, are a part of a small, modular, distributed, self-sufficient plant for conversion of stranded gas to fungible, easily transportable products using an engine-based reformer and syngas intermediate. Such plants and systems are disclosed and taught in US patent publication no. 2022/0388930 and in U.S. patent application Ser. No. 17/953,056 (filed Sep. 26, 2022), the entire disclosure of each of which is incorporated herein by reference.

Turning to FIGS. 7 to 10 there is provided graphs showing general and optimal teachings for the efficient and enhanced operation of embodiments of CCUS systems and processes. These FIGS., among other things, provide for phase diagrams demonstrating mechanical separation of $CO_2$ by forming a separate $CO_2$ condensed (liquid or solid) phase.

Figure 7:
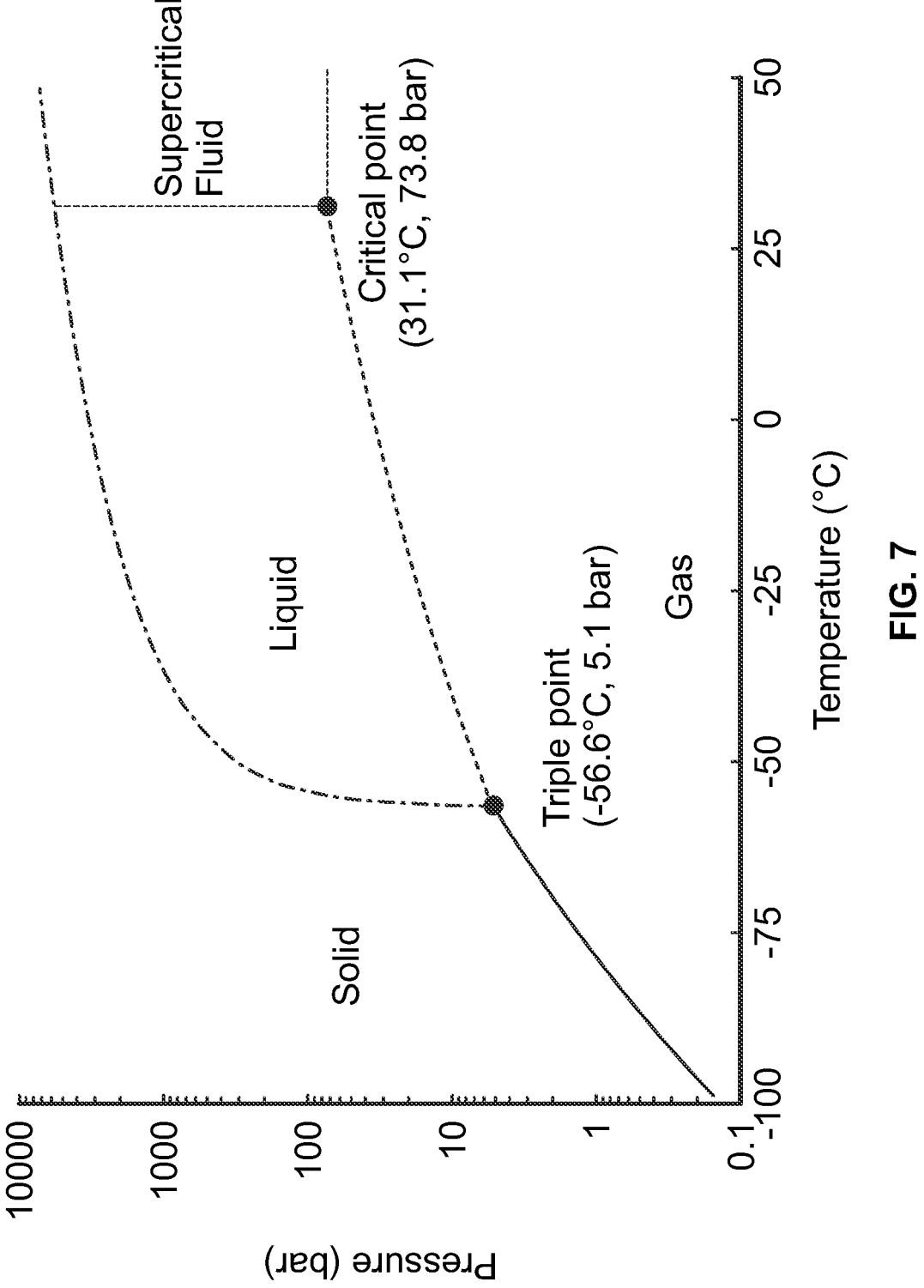
FIG. 7 is a graph showing a phase diagram for pure $CO_2$ for use with embodiments in accordance with the present inventions.

FIG. 7 shows a phase diagram for $CO_2$. The phase diagram shows the regions of temperature and pressure where gaseous, liquid, and solid phases exist. The lines separating the phases, show where two phase are in equilibrium (e.g., liquid and gas). Along these lines, a system containing pure $CO_2$ has a single degree of freedom according to the Gibbs phase rule (i.e., if temperature is specified, pressure is fixed and vice versa). The gas-liquid line corresponds to vaporization/condensation, the liquid-solid line represents melting/freezing, and the gas-solid line represents sublimation/deposition. Deposition is also sometimes referred to as a de-sublimation or frosting. The triple point (−56.6° C., 5.1 bar) is the point where all three phases (gas, liquid, and solid) coexist and the degrees of freedom are zero (i.e., the independent intensive properties, such as T and P, are fixed). $CO_2$ is fairly unique in that it has a fairly high triple point. As a result, deposition becomes a consideration for mechanical separation from gaseous $CO_2$ mixtures. In general, high pressures and low temperatures favor the formation of condensed phases, either liquid or solid.

Figure 8:
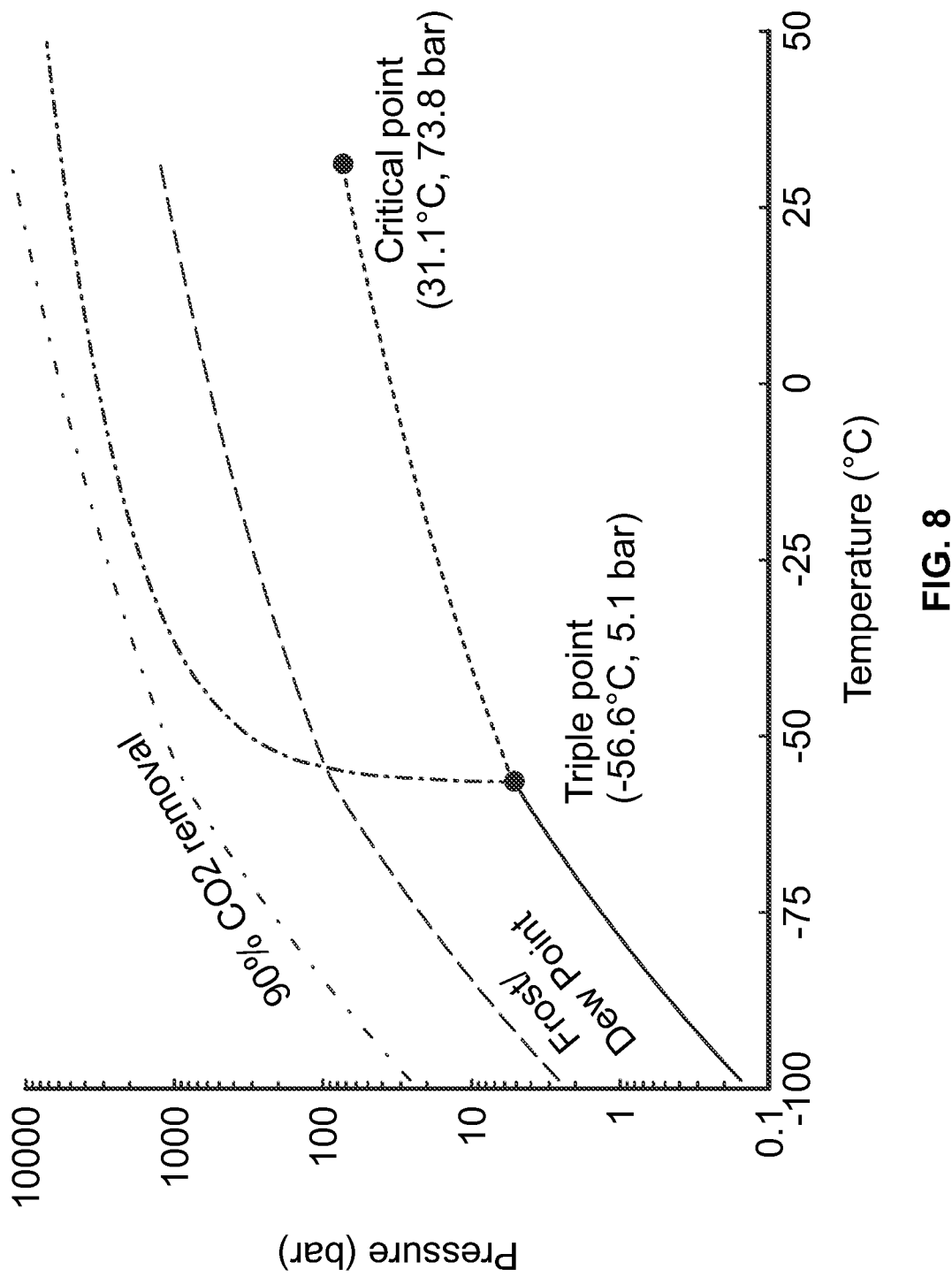
FIG. 8 is a graph showing a phase diagram for $CO_2$ overlaid with pressure required for onset of frost/dew formation and for 90% $CO_2$ removal for a gas mixture containing nominally 6 mol % $CO_2$, in accordance with an embodiment of the present inventions.

FIG. 8 shows a $CO_2$ phase diagram overlaid with curves for deposition/frosting and for 90% $CO_2$ removal from a gas mixture nominally containing 6 mol % $CO_2$ with the balance being substantially non-condensing gases (e.g., nitrogen). The dashed curves in this figure assume an ideal gas mixture that follows ideal mixture theory. In reality, there are some significant deviations from the ideal behavior, especially for condensation from dilute $CO_2$ mixture as will be discussed later, however the general trends are instructive, particularly for deposition of solid $CO_2$ from gas mixtures. In this ideal scenario, the $CO_2$ begins to deposit (or frost) from a gas mixture when its partial pressure equals the pressure of the gas-solid line ($P_{dep}$) on the phase diagram. For a 6 mol % $CO_2$ mixture, that partial pressure is achieve when $P=P_{dep}$ $(T)/y_{CO2}$ where $y_{CO2}$ is the mole fraction of $CO_2$ in the gas mixture. As $CO_2$ frosts out of the gas mixture $y_{CO2}$ drops meaning that the required pressure to deposit solid $CO_2$ becomes higher. At 90% $CO_2$ removal $y_{CO2}$ has decreased from 6% to 0.6% in this example, and the required pressure to reach that level of removal is 10-fold higher than the frost point line. While 6% $CO_2$ is representative of the unreacted syngas exhaust stream in the envisioned process, this analysis holds for other $CO_2$ concentrations.

Figure 9:
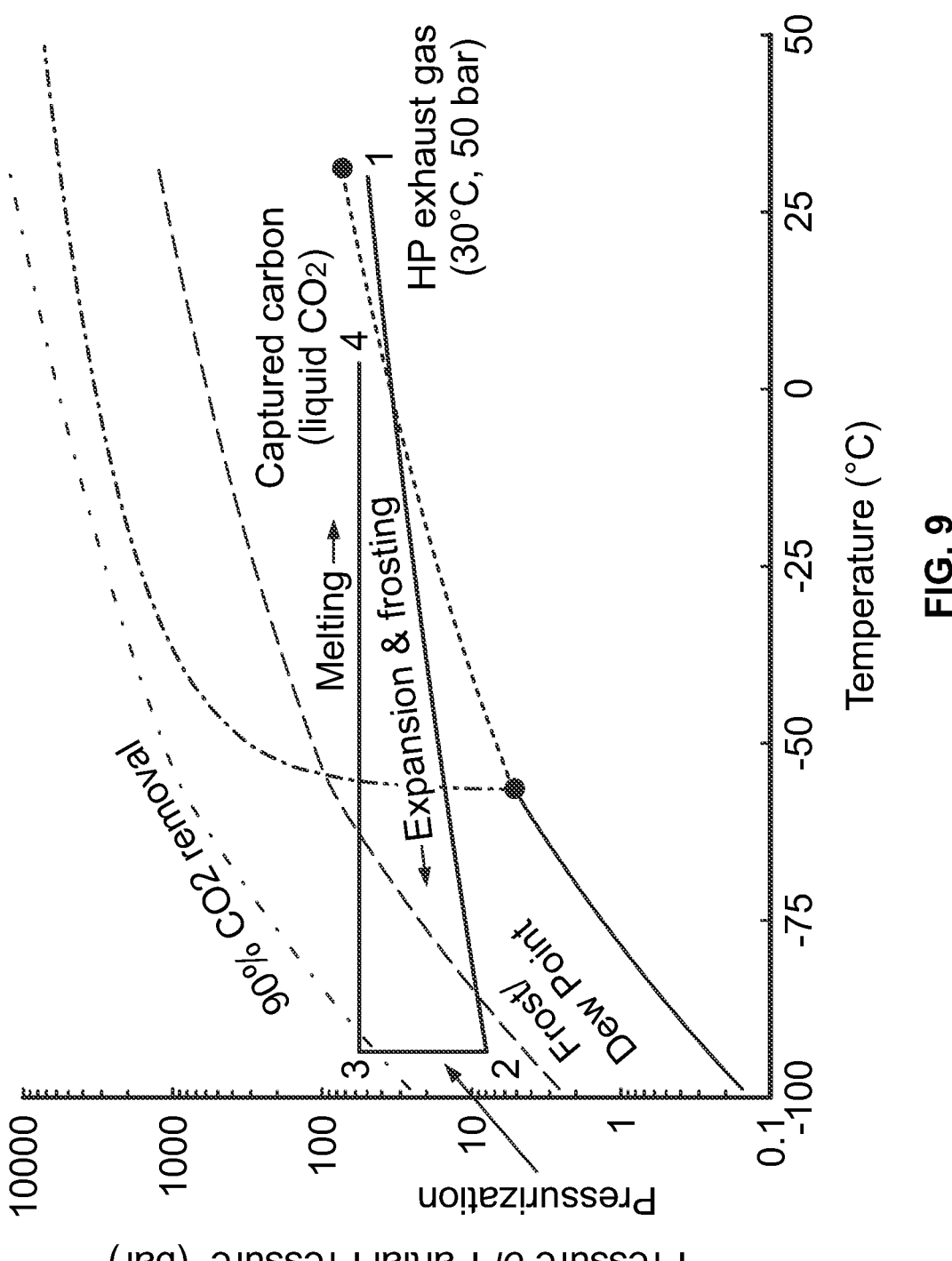
FIG. 9 is a graph showing a phase diagram for $CO_2$ overlaid with state points and processes for a deposition-based carbon capture strategy, in accordance with an embodiment of the present inventions.

FIG. 9 shows a version of FIG. 8 further overlaid with state points corresponding to the stream numbers in FIG. 5. This figure demonstrates thermodynamically the process described for FIG. 5. State point 1 (30° C., 50 bar) is nominally the conditions of the syngas exhaust stream of FIG. 4. The curve connecting State points 1 and 2 is indicative of an isentropic expansion process. State point 2 is beyond the frost point line, indicating that solid $CO_2$ would form at these conditions. The temperature could be further reduced using recuperative heat exchangers as shown in FIG. 5. The line connecting States 2 and 3 represents pressurization of the solid $CO_2$ dispersed phase in a pump, such as a progressive cavity pump or the like. The work associated with the pressurization is minimal because of the low compressibility of the solid. The final leg of the cycle connects States 3 and 4 and represents the melting of the solid $CO_2$ in the $CO_2$-side of the recuperator. Although not depicted in this diagram, optionally some melting may occur in the pump, forming a slurry and improving the pumpability of the dispersed solid $CO_2$. The end state, State 4, is liquid $CO_2$ at nominally ambient temperature that may be easily transported and used for a variety of purposes as described above.

Figure 10:
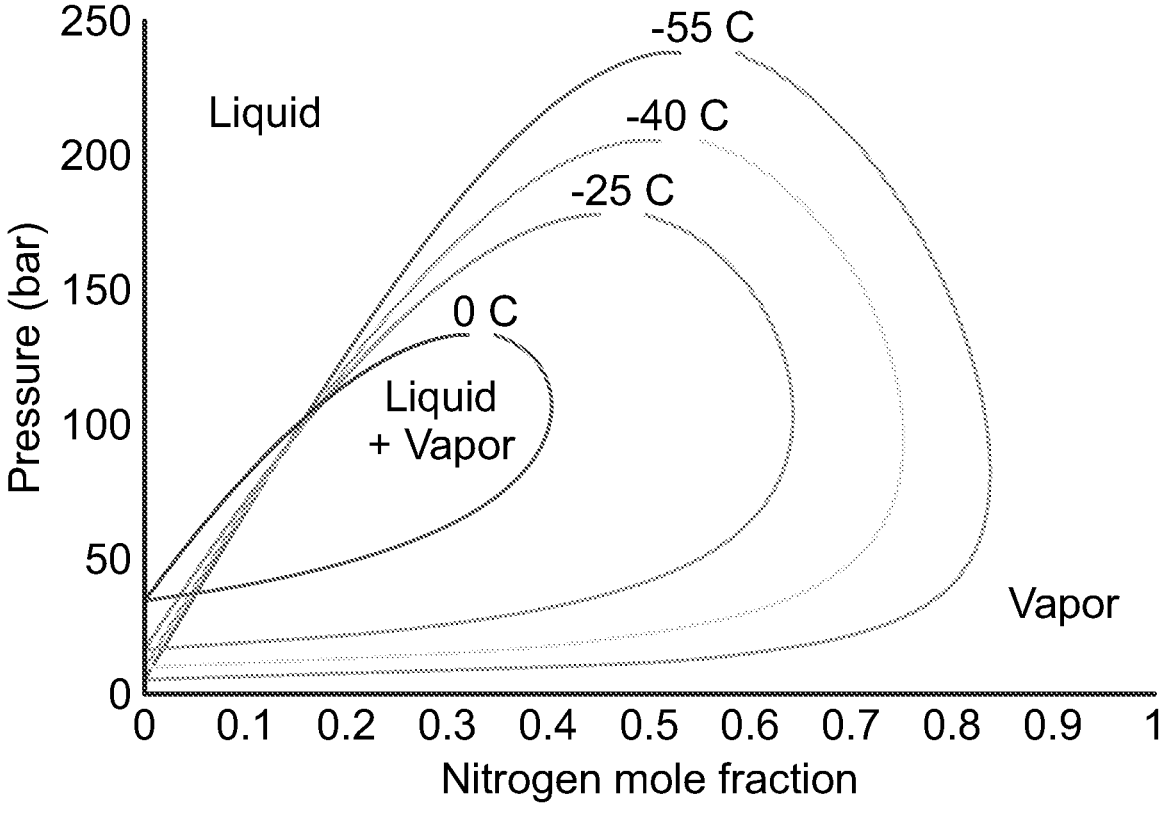
FIG. 10 is a graph showing a Pxy diagram showing vapor-liquid equilibrium for a $N_2$+$CO_2$ mixture calculated with the Peng-Robinson equation of state, in accordance with an embodiment of the present inventions.

FIG. 10 shows a Pxy diagram showing vapor-liquid equilibrium (VLE) for a mixture of $N_2$ and $CO_2$ calculated with the Peng-Robinson equation of state (PR EOS). The PR EOS is known to be in good agreement with experimental VLE data for this system. While $N_2$ is used in this example, the results are substantially similar for other non-condensable gases. The vertical axis shows the system pressure, and the horizontal axis shows the mole fraction of $N_2$. Curves are shown for temperatures of 0, −25, −40, and −55° C. The curve for −55° C. is very near the minimum temperature for this VLE behavior as it is just above the triple point temperature (−56.6° C.), below which vapor and liquid $CO_2$ do not coexist. The portion of each curve on the right shows the dew point pressure and the portion on the left shows the bubble point pressure. The region inside the "dome" or locus of points defining the bubble/dew points, is the two-phase liquid-vapor region. At a given pressure, a tie line drawn across the vapor-liquid dome intersects the bubble point dew point curves at the equilibrium liquid (x) and vapor (y) mole fractions of $N_2$. For this binary mixture, the mole fraction of $CO_2$ is one minus the mole fraction of $N_2$ (e.g., $y_{CO2}=1-y_{N2}$). This figure demonstrates some deviation from the ideal behavior assumed for FIGS. 8 and 9. For example, liquid $CO_2$ will not condense at any temperature and pressure for a mixture containing more than about 84 mol % $N_2$ (or conversely less than 14% $CO_2$). As the typical syngas exhaust stream contains about 6% $CO_2$, this indicates that direct condensation of liquid $CO_2$ from this stream is not possible. This surprising result underlies the approach of exploiting deposition to solid $CO_2$, rather than condensation of liquid $CO_2$, in the process described in FIG. 9. However, in a scenario that used air separation to reject some of the nitrogen from the inlet air in FIG. 4, direct condensation of liquid $CO_2$ would be possible because the $CO_2$ mole fraction would be higher without the nitrogen dilution.

The following examples are provided to illustrate various embodiments of the present CCUS systems and methods, and their components. These examples are for illustrative purposes, may be prophetic, and should not be viewed as, and do not otherwise limit the scope of the present inventions.

EXAMPLES

Example 1

$CO_2$ is separated from a process stream using mechanical separation based on different phases of matter. In a preferred scenario, this embodiment is used on the retentate stream from the hydrogen separator. The stream is expanded and cooled so that $CO_2$ separates into a condensed phase (either liquid or solid). One or more recuperators can be used to pre-cool the stream prior to the expansion process. In a preferred scenario, a turbo-expander is used to expand and cool the high-pressure stream while recovering useful work that can be used elsewhere in the process. For process streams with a low concentration of $CO_2$ (below about 15%), deposition (also called frosting or desublimation) is preferred to formation of liquid $CO_2$, which is thermodynamically not possible at lower $CO_2$ mole fractions. However, if lower concentrations of nitrogen are carried through the process (e.g., by using air separation on the inlet air or rejecting nitrogen from the syngas), direct formation of liquid $CO_2$ is possible. In the case of deposition of solid $CO_2$, the dispersed (i.e., particulate and not bulk) solid $CO_2$ can be compressed and reheated (in a recuperative heat exchanger) to melt the solid $CO_2$ and produce liquid $CO_2$ for a variety of uses. The compression of the solid $CO_2$ requires minimal work because of the low compressibility of the solid compared to a gas. The liquid $CO_2$ can be used for local re-injection to stimulate the well (EOR) or transported via pipeline, rail tank car, tanker truck, or the like for a variety of industrial uses. Optionally, the mechanical separation can also be used on the gas-phase effluent of the product (e.g., methanol) condensation and collection process. In that case, the $CO_2$ separation can also provide syngas ratio adjustment.

Example 2

$CO_2$ is separated from a process stream using chemical/physical separation. In a preferred scenario, this embodiment is used on the effluent from the product (e.g., methanol) product condensation and collection step. In this scenario, low-pressure drop through the $CO_2$ separation is preferred to minimize the work required to recompress the recycle stream. The chemical/physical separation can be used in addition to or in place of the hydrogen separation step. Both the hydrogen separation and the $CO_2$ separation are methods to perform syngas ratio adjustment as a way to modify the stoichiometry number of the syngas entering the downstream synthesis step. Ratio adjustment is required because the nascent syngas from the reformer will likely not have the proper stoichiometry number when using a partial-oxidation reformer. The chemical/physical $CO_2$ separation method may be one of membrane separation, absorption (e.g., amine stripping), adsorption, or chemical reaction (e.g., carbonate formation). Separation of $CO_2$ from process streams using these operating principles are known in the art. A unique feature of this invention is that the high-pressure stream is used improve the energy efficiency and separations performance of the $CO_2$ separation and recovery step. A further unique feature of the invention is that the unique topology of the engine-based reformer process is leveraged to provide power (e.g., electrical, shaft, pneumatic/hydraulic pressure) to provide the energy inputs for the $CO_2$ separation and recovery process. The captured $CO_2$ can be recovered (e.g., in a desorber) to recover the $CO_2$ while regenerating the sorbent. The liquid $CO_2$ can be used for local re-injection to stimulate the well (EOR) or transported via pipeline, rail tank car, tanker truck, or the like for a variety of industrial uses. Optionally, this invention can be used with air separation on the inlet air or rejecting nitrogen from the syngas to reduce the energy intensity and capital intensity of the separation.

Example 3

Figure 6:
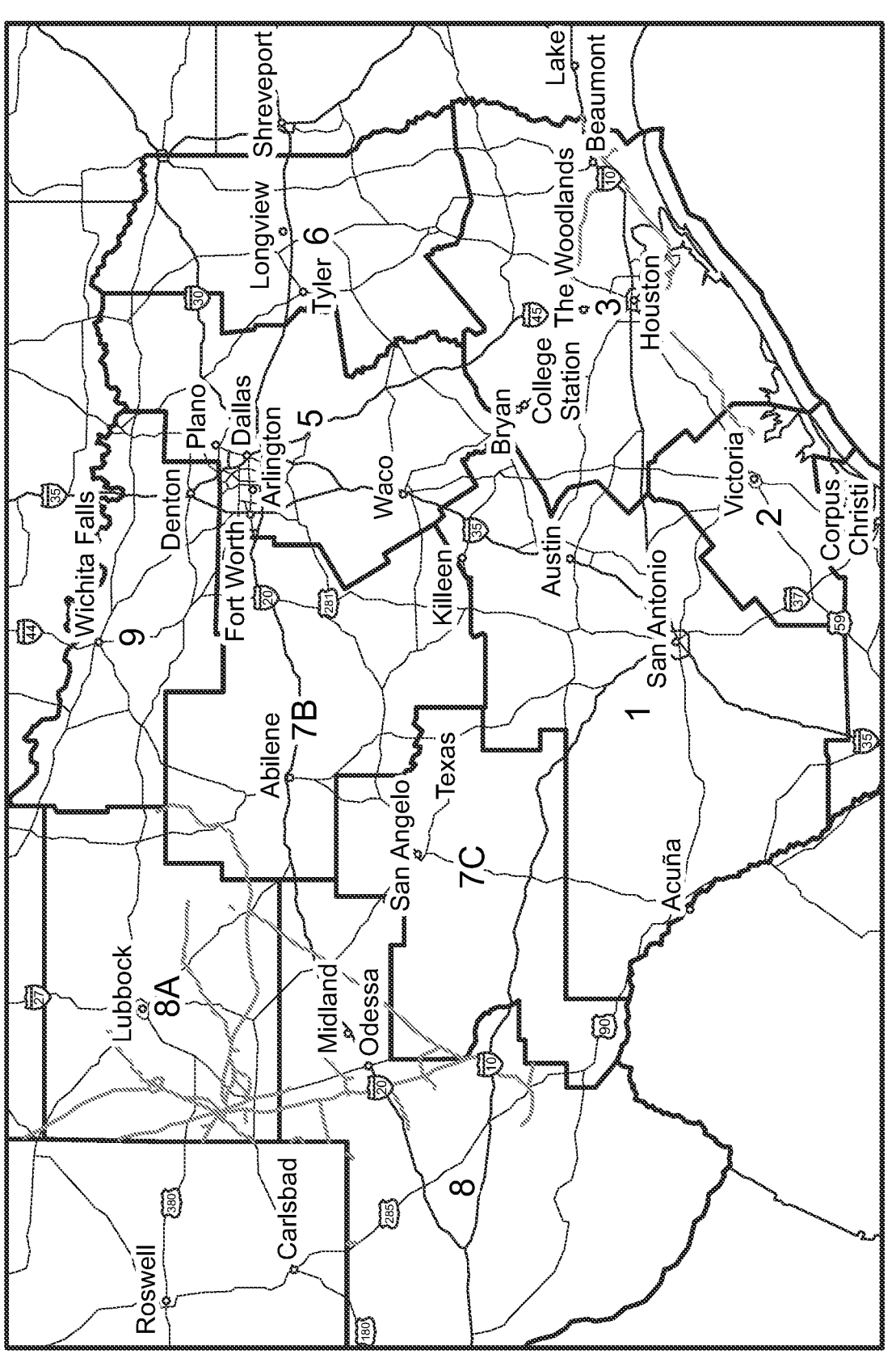
FIG. 6 is a Map of $CO_2$ pipelines (light blue) in the Permian basin, an oil and gas producing region of Texas and the gulf coast of the United States, for use with embodiments in accordance with the present inventions.

Turning to FIG. 6 there is shown a map of $CO_2$ pipelines in the state of Texas, principally in the Permian basin and the gulf coast areas. Currently in the Permian basin, most of the $CO_2$ used for EOR is brought in via pipelines from natural $CO_2$ formations in other states (e.g., Sheep Mountain and McElmo dome in Colorado). The delivered price for $CO_2$ for EOR at well sites in the Permian basin is estimated to be $1-3/Mscf. Anthropogenic $CO_2$ captured from the byproducts of conversion of flare gas to liquid products could provide a distributed, local source of $CO_2$ for EOR at a significantly reduced delivered price. The existing $CO_2$ pipeline infrastructure could serve to distribute $CO_2$ among re-injection sites in the Permian basin.

The $CO_2$ in the existing pipeline infrastructure is in the liquid phase. As such, the liquid $CO_2$ produced from the deposition-based mechanical $CO_2$ separator can be directly injected into these pipelines without additional compression. This is a considerable advantage given that the pressure in the pipelines is at or above the vapor pressure of $CO_2$ at the prevailing temperature, for example above about 60 bar at 25° C.

It is noted that there is no requirement to provide or address the theory underlying the novel and groundbreaking production rates, performance or other beneficial features and properties that are the subject of, or associated with, embodiments of the present inventions. Nevertheless, various theories are provided in this specification to further advance the art in this important area, and in particular in the important area of hydrocarbon exploration, production and downstream conversion. These theories put forth in this specification, and unless expressly stated otherwise, in no way limit, restrict or narrow the scope of protection to be afforded the claimed inventions. These theories many not be required or practiced to utilize the present inventions. It is further understood that the present inventions may lead to new, and heretofore unknown theories to explain the conductivities, fractures, drainages, resource production, chemistries, and function-features of embodiments of the methods, articles, materials, devices and system of the present inventions; and such later developed theories shall not limit the scope of protection afforded the present inventions.

The various embodiments of devices, systems, activities, methods and operations set forth in this specification may be used with, in or by, various processes, industries and operations, in addition to those embodiments of the figures and disclosed in this specification. The various embodiments of devices, systems, methods, activities, and operations set forth in this specification may be used with other processes industries and operations that may be developed in the future; with existing processes industries and operations, which may be modified, in-part, based on the teachings of this specification; and with other types of gas recovery systems and methods. Further, the various embodiments of devices, systems, activities, methods and operations set forth in this specification may be used with each other in different and various combinations. Thus, for example, the configurations provided in the various embodiments of this specification may be used with each other. For example, the components of an embodiment having A, A' and B and the components of an embodiment having A", C and D can be used with each other in various combination, e.g., A, C, D, and A, A" C and D, etc., in accordance with the teaching of this specification. Thus, the scope of protection afforded the present inventions should not be limited to a particular embodiment, configuration or arrangement that is set forth in a particular embodiment, example, or in an embodiment in a particular figure.

The invention may be embodied in other forms than those specifically disclosed herein without departing from its spirit or essential characteristics. The described embodiments are to be considered in all respects only as illustrative and not restrictive.

What is claimed:

1. A gas-to-liquid system comprising a primary synthesis loop configured for operation at a pressure above about 30 bar, the system further comprising:

a. a means for providing a high-pressure process stream containing $CO_2$, after (i) condensation and collection of a liquid product, (ii) collection of an easily condensable product or (iii) both products; wherein the products comprise one or more of as methanol, ethanol, mixed alcohols, ammonia, dimethyl-ether F-T liquids;

b. a $CO_2$ separator, wherein the $CO_2$ separator is configured to operate based on mechanical separation of a condensed-phase, a solid, a liquid, or a solid and liquid, $CO_2$; and, c. a means for capturing a $CO_2$-rich stream for use, sequestration or both.

2. The system of claim 1, comprising a means to recycle of a $CO_2$-depleted stream to a downstream synthesis process or an upstream reformer.

3. The system of claim 1, wherein the high-pressure, process stream comprises at least one of a gas-phase effluent of the product condensation and collection step or a retentate of a hydrogen separation step.

4. The system of claim 1, wherein the $CO_2$ separator is for syngas ratio adjustment; thereby eliminating the need for a hydrogen separation step; and further comprising a splitter and purge stream.

5. The system of claim 1, wherein a $CO_2$-depleted stream is at high-pressure and the system is configured to recycle the $CO_2$-depleted stream to a downstream synthesis process without substantial recompression.

6. The system of claim 1, comprising a means for the mechanical separation of a condensed phase $CO_2$ using expansion; and wherein the means comprises at least one of a turbo-expander, a valve to promote condensation deposition or both via a cooling effect of gas expansion.

7. The system of claim 1, comprising a means for the use of one or more recuperating heat exchangers to pre-cool a gas to a turbo-expander and promote melting of a dispersed-phase, solid $CO_2$.

8. The system of claim 1, comprising a pump configured to compress a dispersed-phase, solid $CO_2$, a slurry containing solid and liquid $CO_2$, or both prior to melting.

9. The system of claim 1, comprising a means for re-injection of a liquid $CO_2$ at a well site for one or more of sequestration and enhanced oil recovery.

10. The system of claim 1, comprising a means for inlet air separation or syngas nitrogen rejection to reduce the amount of nitrogen carried through the process and therefore increase the $CO_2$ concentration, reducing the energy intensity and capital cost of the carbon capture.

11. The system of claim 1, an engine-based reformer configured to provide power to perform the separation.

12. The system of claim 1, wherein the gas-to-liquid plant is a small-scale system.

13. The system of claim 1, comprising a syngas engines.

14. The system of claim 1, having a scale of from 80,000 scfd to 3,000,000 scfd.

15. The system of claim 1, having a scale of from 20,000 scfd to 100,000 scfd.

16. The system of claim 1, having a scale of from 250,000 scfd to 25,000,000 scfd.

17. The system of claim 1, having a scale of from less than 25,000,000 scfd.

18. The system of claim 1, having a scale of from less than 10,000,000 scfd.

19. The system of claim 1, having a scale of from less than 5,000,000 scfd.

20. A gas-to-liquid system comprising a primary synthesis loop configured for operation at an operation pressure, the system further comprising:

a. an infeed line in fluid communication with a source of a high-pressure stream comprising $CO_2$;

b. a first recuperator in fluid commination with the infeed line;

c. a turbo expander in fluid communication with the first recuperator;

d. a $CO_2$ separator in fluid communication with the turbo expander; the $CO_2$ separator comprising a first outlet and configured to provide a $CO_2$-depleted stream of gas from the first outlet;

e. a line placing the first outlet of the $CO_2$ separator in fluid communication with the first recuperator, whereby a $CO_2$-depleted stream of gas is used to cool the high-pressure stream comprising $CO_2$.

21. The system of claim 20, wherein the source of the high-pressure stream comprising $CO_2$ comprises a retentate from a hydrogen separator.

22. The system of claim 20, where in the operating pressure is above about 30 bar.

23. The system of claim 21, where in the operating pressure is above about 30 bar.

24. A gas-to-liquid system comprising a primary synthesis loop configured for operation at an operation pressure, the system further comprising:

a. an infeed line in fluid communication with a source of a high-pressure stream comprising $CO_2$;

b. a first recuperator in fluid commination with the infeed line;

c. a second recuperator in fluid communication with the first recuperator;

d. a turbo expander in fluid communication with the second recuperator;

e. a $CO_2$ separator in fluid communication with the turbo expander; the $CO_2$ separator comprising a first outlet and configured to provide a $CO_2$-depleted stream of gas from the first outlet; the $CO_2$ separator comprising a second outlet and configured to provide a $CO_2$-rich stream of material from the second outlet;

f. a line placing the first outlet of the $CO_2$ separator in fluid communication with the first recuperator, whereby a $CO_2$-depleted stream of gas is used to initially cool the high-pressure stream comprising $CO_2$;

g. a line placing the second outlet of the $CO_2$ separator in fluid communication with the second recuperator, whereby the $CO_2$-rich stream of material is used to further cool the high-pressure stream comprising $CO_2$; and, h. a line placing the second recuperator in fluid with a $CO_2$ storage, transfer or both device, whereby the $CO_2$-rich stream of material is stored, transferred or both.

25. The system of claim 24, wherein the source of the high-pressure stream comprising $CO_2$ comprises a retentate from a hydrogen separator.

26. The system of claim 24, where in the operating pressure is above about 30 bar.

27. The system of claim 26, where in the operating pressure is above about 30 bar.

\* \* \* \* \*